United States Patent
Kondylis et al.

(10) Patent No.: US 6,665,311 B2
(45) Date of Patent: Dec. 16, 2003

(54) METHOD AND APPARATUS FOR ADAPTIVE BANDWIDTH RESERVATION IN WIRELESS AD-HOC NETWORKS

(75) Inventors: George Kondylis, Palo Alto, CA (US); Bong K. Ryu, Thousand Oaks, CA (US); Mahesh Marina, Farmingville, NY (US); Ulas Kozat, Greenbelt, MD (US)

(73) Assignee: HRL Laboratories, LLC, Malibu, CA (US)

( * ) Notice: Subject to any disclaimer, the term of this patent is extended or adjusted under 35 U.S.C. 154(b) by 36 days.

(21) Appl. No.: 10/007,321

(22) Filed: Nov. 9, 2001

(65) Prior Publication Data

US 2003/0012176 A1 Jan. 16, 2003

Related U.S. Application Data

(60) Provisional application No. 60/247,280, filed on Nov. 9, 2000.

(51) Int. Cl.[7] .................................. H04J 12/28
(52) U.S. Cl. ......................... 370/462; 370/461
(58) Field of Search ................. 370/336, 337, 370/345, 347, 348, 468, 230, 321, 322, 324, 326, 458, 459, 461, 462

(56) References Cited

U.S. PATENT DOCUMENTS

| | | | |
|---|---|---|---|
| 5,654,968 A | * 8/1997 | Smiroldo | 370/443 |
| 5,677,909 A | * 10/1997 | Heide | 370/347 |
| 6,577,613 B1 | * 6/2003 | Ramanathan | 370/337 |

FOREIGN PATENT DOCUMENTS

| | | |
|---|---|---|
| WO | WO 00 16518 A | 3/2000 |

OTHER PUBLICATIONS

Tang et al., Collision–Avoidance Transmission Scheduling for Ad–Hoc Networks, IEEE Infocom 2000, 1788–'94.*

Tang Z., et al. "Hop reservation multilpe access for multi-channel packet radio netwrks" Computer Communications, Elsevier Science Publishers BV, Amsterdam, NL, vol. 23, No. 10, May 2000, pp. 877–886, XP004197802.

Z. Tang, and J. Garcia–Luna Aceves, "A protocol for topology-dependent transmission scheduling in wireless networks," in Proc. IEEE Wireless Commun. And Netw. Conf. 1999 (WCNC '99), Sep. 1999.

Z. Tang, and Garcia–Luns Aceves, "Hop reservation multiple access (HRMA) for ad–hoc networks," in Proc. IEEE Infocom '99, Mar. 1999.

C. Zhu, and S. Corson, "A five phase reservation protocol (FPRP) for mobile ad–hoc networks," in Proc. IEEE Infocom 1998, Apr. 1998.

I. Chlamtac, A. Farago, and H Zhang, "Time–spread multiple access (TSMA) protocols for multihop mobile radio networks," IEEE/ACM Trans. Netw., pp. 804–812, Dec. 1997.

J. Ju, and V. Li, "TDMA scheduling design of multihop packet radio networks based on latin squares," IEEE J. Select. Areas Commun., pp.1345–1352, Aug. 1999.

* cited by examiner

Primary Examiner—Wellington Chin
Assistant Examiner—William Schultz
(74) Attorney, Agent, or Firm—Tope-McKay & Associates

(57) ABSTRACT

An apparatus, a method, and a computer program product for effective communication routing of unicast and broadcast data traffic in wireless ad-hoc networks are presented. The routing technique separates the signaling and data transmission portions of a data frame such that the length of the signaling portion is independent of the length of the data portion. In the signaling portion, reservations are able to be performed and confirmed, while the data portion also includes a reservation confirmation portion which allows reservations made in during the signaling portion of the frame to be confirmed immediately prior to transmission of the data. In addition, the present invention also provides a mechanism for dynamically adjusting reservations.

16 Claims, 16 Drawing Sheets

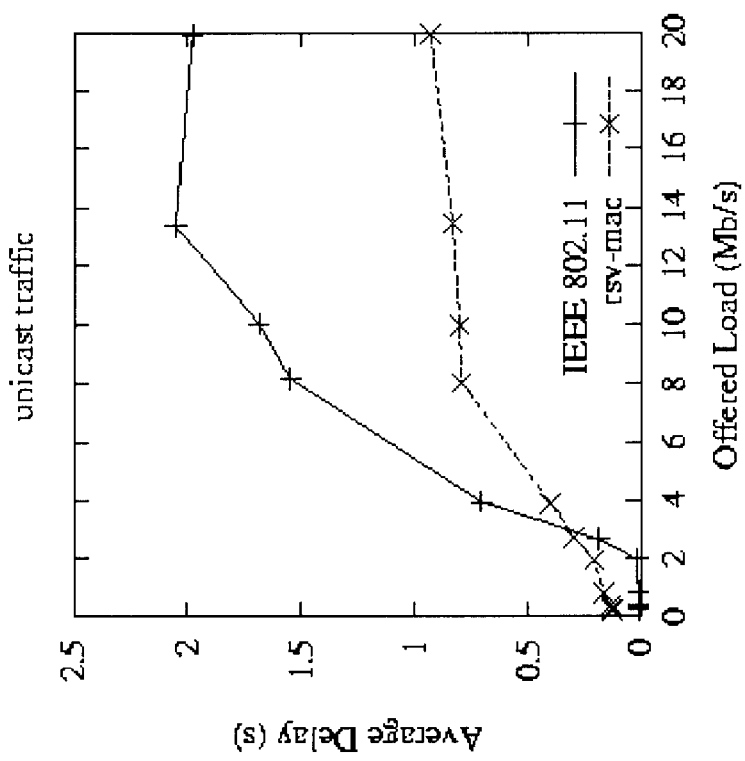
FIG. 8b
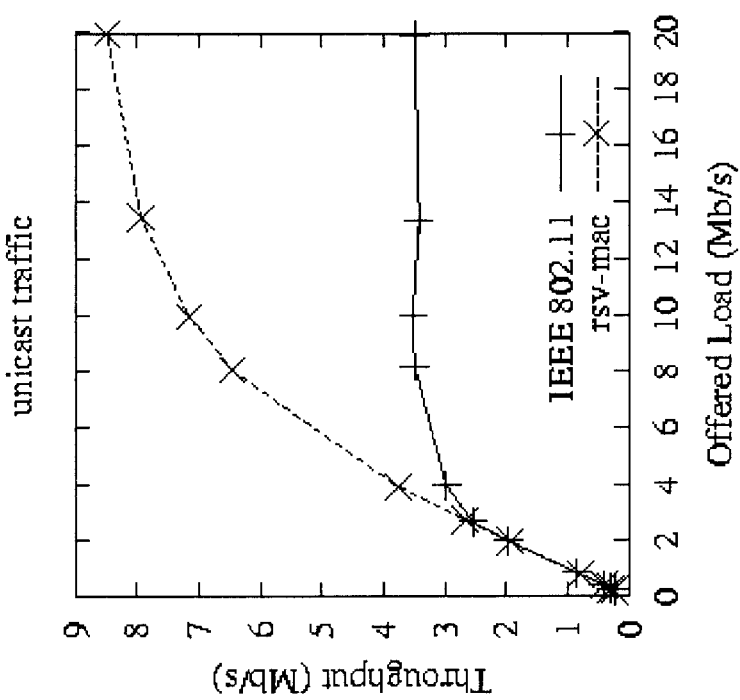
FIG. 8a
FIG. 8

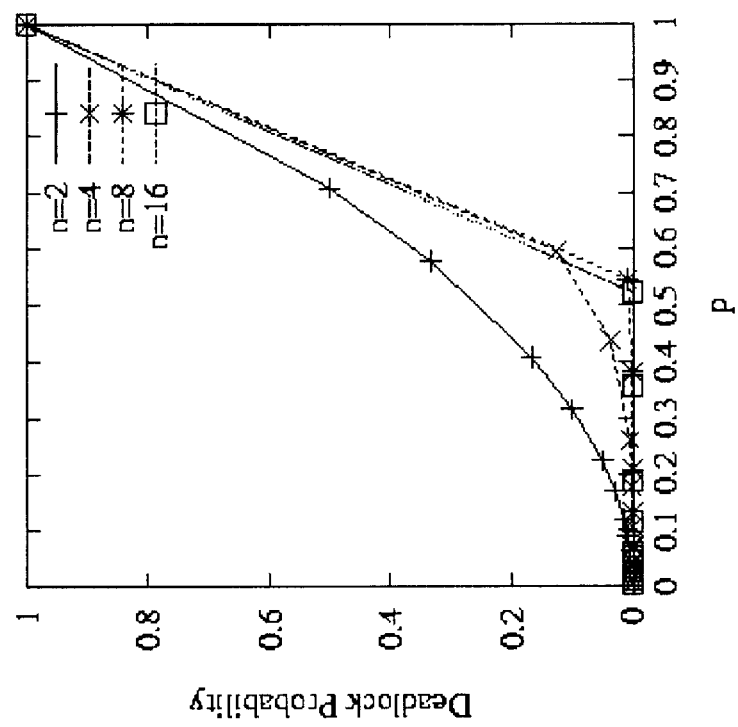
FIG. 16b
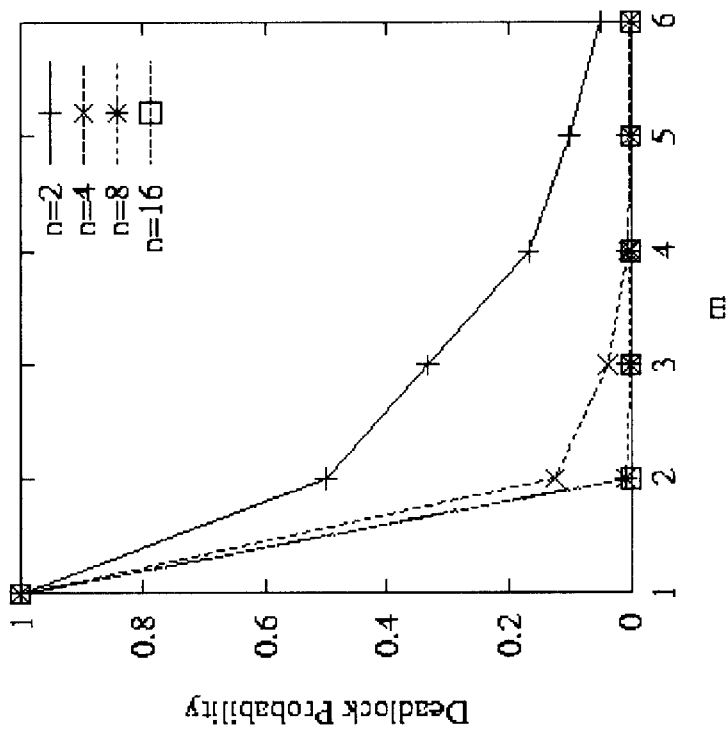
FIG. 16a
FIG. 16

METHOD AND APPARATUS FOR ADAPTIVE BANDWIDTH RESERVATION IN WIRELESS AD-HOC NETWORKS

PRIORITY CLAIM

This application claims the benefit of priority to provisional applications No. 60/247,280, filed in the United States on Nov. 9, 2000, and titled "A Resolution-based MAC Protocol for Reliable Broadcast in Mobile Ad-hoc Networks".

BACKGROUND

(1) Technical Field

The present invention relates to the field of computer networking, and more particularly to techniques for adaptive bandwidth reservation in wireless ad-hoc networks.

(2) Discussion

Research in QoS enabled medium access control protocols (MACs) for ad-hoc network is still in its infancy. However, with increasing interest in wireless networks, and the increasing need to create networks, or portions of networks, that are mobile and less reliant on physical wiring, research in the wireless arena is growing rapidly.

Two major areas of importance in wireless network communications are unicast and broadcast communications. Unicast transmissions are considered those transmissions in which a unique transmitter sends a signal to a unique receiver for that signal. Broadcast transmissions, on the other hand, are considered those transmissions in which a single transmitter sends a signal to multiple receivers.

In the literature, many articles have appeared discussing various aspects of unicast and broadcast wireless network communications. Several examples of these articles are provided herein for reference.

In Z. Tang, and J. Garcia-Luna Aceves, 'A protocol for topology-dependent transmission scheduling in wireless networks,' in *Proc. IEEE Wireless Commun. And Netw. Conf.* 1999 (*WCNC '99*), September 1999, for example, the authors present a synchronous MAC that supports both unicast and broadcast reservations. Their signaling scheme provides for signaling minislots inside data slots. This forces nodes that contend for a specific data slot to do so specifically in a minislot corresponding to the data slot for which they wish to contend. Unfortunately, there is a drawback in that this signaling scheme has an adverse effect on throughput, especially when a network is heavily loaded; that is, when many data slots are already reserved and few are left available, contention for open slots will be very heavy, since the signaling bandwidth is limited to the small amount taken from the data slots.

Time division multiple access (TDMA)—based techniques for broadcast scheduling have also been presented, falling under two general categories: topology independent and topology dependent. In topology independent scheduling protocols, nodes transmit in a number of slots in every frame. The slots in which a node can transmit are assigned (according to a unique code) such that the node can send at least one collision-free packet to every neighbor in each frame. The main limitations of the topology independent scheduling protocols are: (i) the sender is uncertain about which of its neighbors received its transmission in a particular slot (therefore, the sender has to transmit the same packet in multiple slots in a frame); and (ii) the number of slots must be greater than the number of nodes in the two-hop neighborhood. This constraint on the frame length limits the scalability of these protocols. Topology dependent protocols, on the other hand, compute a transmission schedule so that each node can send unicast or broadcast transmissions in a reserved slot with a very low probability of collisions. The reservation mechanism itself is contention-based, i.e., nodes contend among each other in order to reserve a slot. Moreover, these schedules have to be dynamic to increase the channel utilization by spatial reuse of the slots. Also, nodes may have to re-compute/update their schedules to adapt to topological changes in a mobile ad hoc network.

Two recent efforts separated the signaling transmissions and the data transmissions in a distributed protocol. The first is from C. Zhu, and S. Corson, 'A five phase reservation protocol (FPRP) for mobile ad-hoc networks,' in *Proc. IEEE INFOCOM* 1998, April 1998, called the Five-Phase Reservation Protocol (FPRP), that performs both broadcast scheduling and channel access functions. In FPRP, reservation signaling precedes the actual data portion of a frame and the nodes can contend for a data slot only in the corresponding set of reservation slots. In this way, the protocol is not scalable in the number of data slots available. Additionally, the protocol does not adapt to mobility. The authors themselves note that in the presence of mobility, their protocol would have to be run periodically, which makes its usefulness questionable.

In Z. Tang, and J. Garcia-Luna Aceves, 'A protocol for topology-dependent transmission scheduling in wireless networks,' in *Proc. IEEE Wireless Commun. And Netw. Conf.* 1999 (*WCNC '99*), September 1999, the Collision-Avoidance Time Allocation (CATA) protocol is proposed. CATA is designed to support unicast reservations apart from broadcast reservations. In contrast to FPRP, slot reservation in CATA is done within the slot itself. However, CATA has a severe drawback in that contention bandwidth is reduced with successful reservations. Additionally, this rather simple signaling scheme for broadcast reservations can result in deadlocks if we assume half-duplex radios. A deadlock is said to occur if two conflicting broadcasts are scheduled in the same slot and the senders do not realize this conflict. The possibility of deadlocks is identified in these references and solutions which allow nodes to detect this situation are outlined, but the downside of the solutions provided is that data packets are lost until the deadlock goes undetected. Deadlocks can arise quite often in ad hoc networks, for e.g. when every node in the neighborhood has a broadcast packet to send at the same time following a topology change.

Despite these advances in wireless network communications, much improvement is still needed. In order to overcome the limitations discussed above, it is desirable to provide a technique in which signaling bandwidth is independent of data bandwidth, and therefore contention of new reservations is independent of the loading of the network. Furthermore, it is desirable to provide a technique by which nodes can use a successful contention mini-slot in order to reserve more than one data slot, depending e.g. on their queue sizes. Finally, it is also desirable to provide a technique that incorporates an acknowledgment mechanism in order to ensure reservation reliability and that facilitates both unicast and broadcast network traffic.

(3) References

[1] C. Zhu, and S. Corson, 'A five phase reservation protocol (FPRP) for mobile ad-hoc networks,' in *Proc. IEEE INFOCOM* 1998, April 1998.

[2] Z. Tang, and J. Garcia-Luna Aceves, 'A protocol for topology-dependent transmission scheduling in wireless networks,' in *Proc. IEEE Wireless Commun. And Netw. Conf.* 1999 (*WCNC '99*), September 1999.

[3] I. Chlamtac, A. Farago, and H. Zhang, 'Time-spread multiple access (TSMA) protocols for multihop mobile radio networks,' *IEEE/ACM Trans. Netw.*, pp. 804–12, December 1997.

[4] J. Ju, and V. Li, 'TDMA scheduling design of multihop packet radio networks based on latin squares,' *IEEE J. Selct. Areas Commun*, pp. 1345–52, August 1999.

[5] Z. Tang, and J. Garcia-Luna Aceves, 'Hop reservation multiple access (HRMA) for ad-hoc networks,' in *Proc. IEEE INFOCOM '99*, March 1999.

SUMMARY

An apparatus, a method, and a computer program product for effective communication routing of unicast and broadcast data traffic in wireless ad-hoc networks are presented. The routing technique separates the signaling and data transmission portions of a data frame such that the length of the signaling portion is independent of the length of the data portion. In the signaling portion, reservations are able to be performed and confirmed, while the data portion also includes a reservation confirmation portion which allows reservations made in during the signaling portion of the frame to be confirmed immediately prior to transmission of the data. In addition, the present invention also provides a mechanism for dynamically adjusting reservations.

BRIEF DESCRIPTION OF THE DRAWINGS

These and other features, aspects, and advantages of the present invention will become better understood with regard to the following description, appended claims, and accompanying drawings where:

FIG. 8(a) is a graph depicting a throughput performance comparison between the IEEE 802.11 protocol and the technique of the present invention;

FIG. 8(b) is a is a graph depicting a delay performance comparison between the IEEE 802.11 protocol and the technique of the present invention;

FIG. 16(a) is a graph depicting the deadlock probability in the broadcast case for different values of m, representing different numbers of reservation minislots; and FIG. 16(b) is a graph depicting the deadlock probability for different values of the contention probability p, when nodes contend in one minislot per reservation slot.

DETAILED DESCRIPTION

Figure 1:
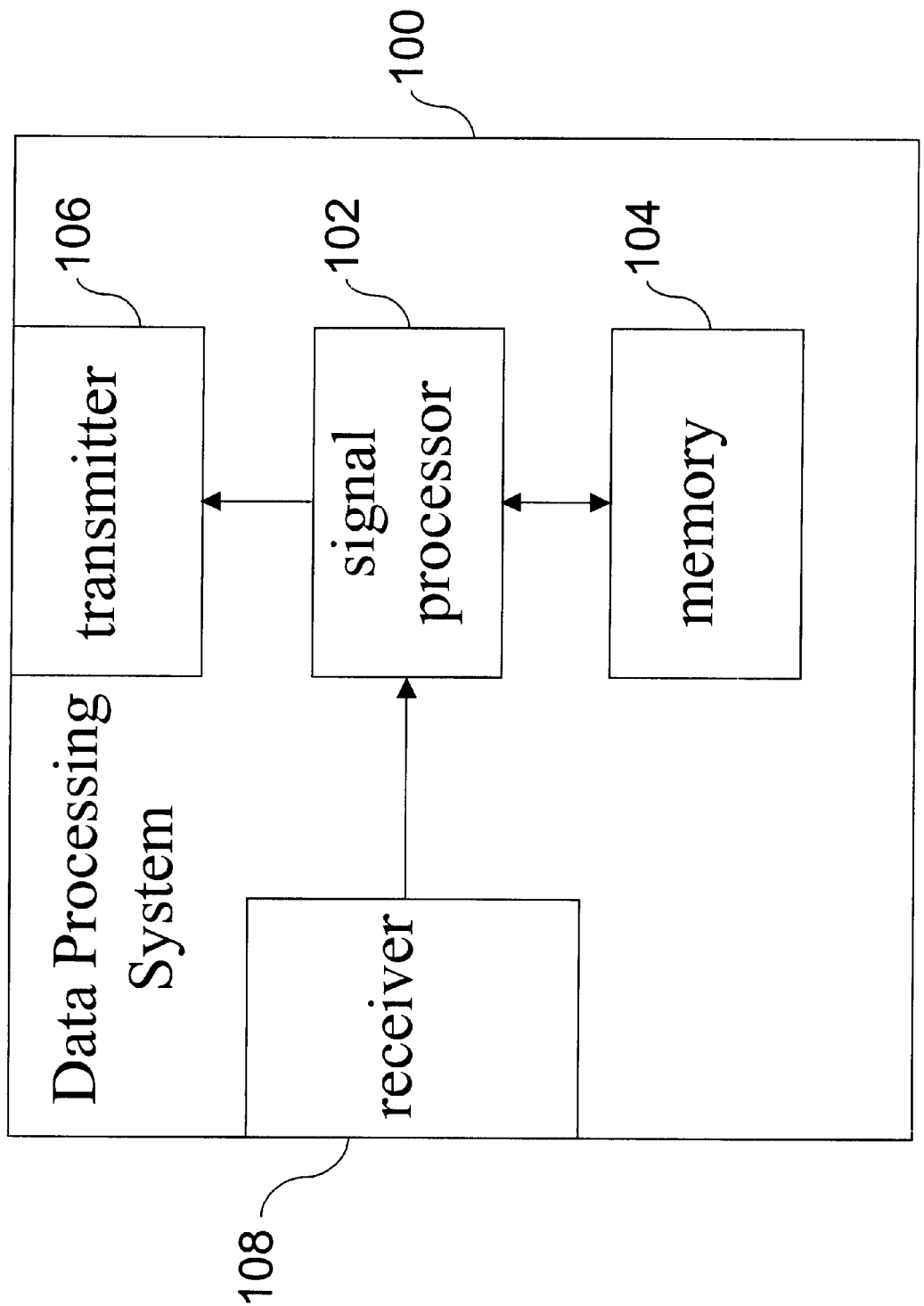
FIG. 1 is a block diagram of a data processing system of the present invention.

The present invention relates to the field of computer networking, and more particularly to adaptive bandwidth reservation in wireless ad-hoc networks. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In order to provide a working frame of reference, first a glossary of terms used in the description and claims is given as a central resource for the reader. Then, a brief introduction is provided in the form of a narrative description of the present invention to give a conceptual understanding prior to developing the specific details. Finally, a more detailed description of the unicast and broadcast communication techniques of the present invention is provided.

(1) Glossary

Means—The term "means" as used in this invention generally indicates a set of operations to be performed on a computer. Non-limiting examples of "means" include computer program code (source or object code) and "hard-coded" electronics. The "means" may be stored in the memory of a computer or on a computer readable medium.

(2) Introduction

The present invention provides an apparatus, method, and computer program product that provides for efficient unicast and broadcast ad-hoc wireless network communications by separating the transmission and reception of signaling for initial reservations from transmission and reception of payload data within a transmission frame. The transmission of the signaling subframe and the data subframe allows for an initial reservation to take place prior to the transmission of data through the use of reservation minislots. As the data is being transmitted, minislots are also included in each data slot within the data subframe in order to check the reservation immediately prior to transmission of each data packet. The initial reservation and reservation check serve as a "double accounting system" to ensure proper data transmission in an environment where apparatus (nodes) are mobile relative to one another, and assists in ensuring proper transmissions as nodes move into and out of range of one another. Specifically, the present invention minimizes the probability of transmission deadlocks among the nodes, data losses due to collisions, and data losses due to nodes moving in and out of transmission range.

Transmission frames are provided for both unicast and broadcast transmission, which provide a data structure for the signaling scheme used in the present invention. The unicast frame structure includes a plurality of signaling minislot triplets, each of which provide an opportunity for nodes to compete for the reservation of at least one data slot, depending on the needs of a particular transmission. Each of the data slots provides a feedback mechanism to ensure the validity of the reservation at the time the data (payload) is transmitted. The signaling portion of the broadcast frame structure provides a plurality of reservation minislots to allow nodes to request reservation of a data slot. Each node typically requests a plurality of data slots for reservation such that the probability of reserving at least one data slot is maximized for each node, while minimizing the probability of a deadlock. The data portion of the broadcast frame structure also provides a plurality of signaling minislots to allow for checking the validity of the reservation of each data slot prior to data transmission.

The present invention has several physical embodiments, which are described immediately below. Subsequent to the discussion of the physical embodiments, the specifics of the unicast frame structure and transmissions within it are provided, along with a discussion of an example of its use. Finally, the specifics of the broadcast frame structure and transmissions within it are provided, along with a discussion of an example of its use.

(3) Physical Embodiments of the Present Invention

The present invention has three principal physical embodiments. The first is an apparatus in the form of a data processing system, typically operating software to facilitate either unicast or broadcast communication among a plurality of nodes. The second physical embodiment is a method, typically software, operating on a data processing system. The third principal physical embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks and flash-type memories. These embodiments will be described in more detail below.

Specifically, a block diagram of a simple embodiment of the data processing system of the present invention is depicted FIG. 1. The data processing system 100 comprises a processor 102, which is typically in the form of a general data processor, such as those commonly used in personal computing devices such as personal computers, personal digital assistants (PDAs), and mobile telephones. On the other hand, the processor 102 may also be a specialized computing processor designed for a more specific task. The data processing system 100 further comprises a memory 104 coupled with the processor 102 for storing software, data, and intermediate processes. A transmitter 106 is also coupled with the processor 102 for transmitting signals and data. The transmitter 106 is preferably in the form of a radio-frequency transmitter, but may also transmit in other mediums such as optics or acoustics. A receiver 108 is also coupled with the processor 102 for receiving signals and data. Similar to the transmitter 106, the receiver 108 is preferably in the form of a radio-frequency receiver, but may also receive in other mediums such as optics or acoustics. The transmitter 106 and receiver 108 may be in the form of separate components, or they may be in the form of a combined transmitter/receiver, collectively termed a "communication interface".

Figure 2:
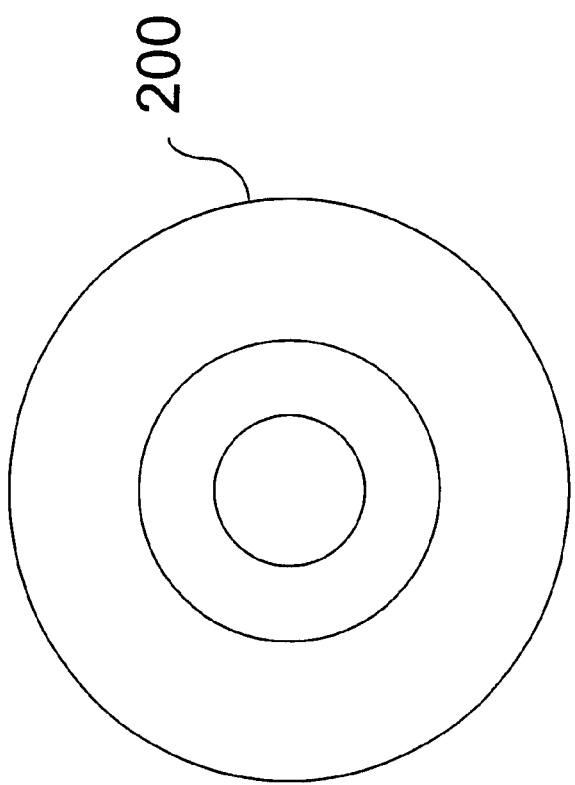
FIG. 2 is an illustrative diagram of a computer program product of the present invention, specifically in the form of a compact disc (CD)

An additional embodiment, an example of a computer program product embodiment of the present invention, is presented illustratively in FIG. 2, with the computer program product 200 depicted as a compact disc.

(4) The Unicast Frame Structure and Transmissions Therein a. Discussion

The unicast frame structure of the present invention provides for an adaptive reservation, half-duplex time division multiple access (TDMA) technique that enables a set of transmitters (using radio frequency or other transmission mediums) to dynamically reserve bandwidth and adapt the reserved bandwidth according to traffic fluctuation for point-to-point (unicast) packet data in wireless ad-hoc networks. The technique provides for an initial bandwidth reservation, a signaling technique for protecting reserved slots, and a triggering technique for changing the level of bandwidth reserved based on the measured traffic rate.

A separate signaling phase is provided to allow ad-hoc nodes to contend for data timeslot reservations in a three-phase reservation sequence. Nodes can reserve multiple slots whenever they win a reservation connection. The signaling phase completely separates signaling bandwidth from data bandwidth so that the fraction of signaling bandwidth needed for reserving specified data bandwidth can be optimized and so that the amount of congestion during reservation (as measured by the collision rate during reservation attempts) becomes independent of the existing load in the overall system of nodes. Additionally, each data slot contains a sequence of mini-slots that are used for re-affirming a reservation in the presence of node mobility. The signaling/reservation scheme is completely distributed and scalable in the number of nodes. It is also robust in the presence of mobility and in the presence of channel errors and/or fading. Finally, the technique continuously monitors the input traffic rate so that it can increase or decrease the reserved bandwidth based on traffic fluctuations.

One application of great interest for wireless ad-hoc networks is the dissemination of data that require strict quality of service (QoS) guarantees such as voice and video. Guarantying QoS in an ad-hoc network is primarily the responsibility of the routing and medium access control (MAC) protocols. The unicast MAC protocol presented herein is specifically designed to support bandwidth reservations for real-time traffic, such as voice and video. Most current MAC protocols are asynchronous, but do not support reservations. The present invention supports the maintenance of reservations in the presence of mobility and channel errors due to interference and fading. That is, once a slot reservation has been successfully performed through the contention phase, the node holding the reservation does not need to re-contend for the same slot in future frames, but simply re-affirms its reservation through signaling inside the reserved data slot. This is important because it eliminates much of the congestion due to reservation requests. In effect, nodes obtaining reservations drop out of contention for as long as they have real-time traffic to transmit.

Some real-time traffic does not transmit at a constant rate. In this case, it is necessary to increase or decrease reserved bandwidth based on the fluctuation of the real-time traffic in order to increase link utilization (by releasing some free timeslots) and reducing buffer delay (by reserving additional timeslots). In this manner, only a proper amount of bandwidth is reserved, thus greatly improving the efficiency of wireless bandwidth.

These features of the present invention have a direct impact on the throughput and delay performance at the MAC layer. Specifically, throughput increases many times over an asynchronous MAC protocol such as IEEE 802.11, especially in spatially distributed networks with many hidden and exposed nodes. Delay performance is also improved dramatically and approximates that of a TDMA MAC. That is, while the overhead is a bit more costly at lower loads, the periodicity of the framing structure causes it to become more constant at higher loads. In contrast, an asynchronous MAC such as IEEE 802.11 exhibits very large delays at high network loadings. In this respect, the constant delay guarantees provided by the present invention are crucial for real-time traffic (such as video and audio transmissions), whose performance suffers greatly from delay variance (jitter).

Before discussing the unicast technique of the present invention, the characteristics of a preferred network in which it is designed to operate optimally will be provided. Note that variations of the present invention may be adapted to networks with other characteristics, as will be apparent to one skilled in the art to which the present invention pertains. The characteristics of the preferred network are very common amongst MAC designs for multihop networks. The transmitters/receivers with which the nodes are assumed to be equipped are half-duplex. In other words, they can either transmit or receive at a given instant, but cannot do both simultaneously. Also, two nodes can communicate only if they are within range of each other. However, when they are out of range of each other, they cannot interfere with each other. That is, there is no cumulative co-channel interference effect from nodes that are out of communication range. Nodes also do not have capture capability, so if two or more packets collide, none are received. Finally, since an important goal of the unicast MAC design presented here is to provide explicit bandwidth reservations for unicast messages, time is slotted and framed. The nodes are assumed to keep perfect timing. This may be accomplished through the use of an external timing device or through the use of sufficient guard times, inserted into the frame to account for relative time uncertainties. A more comprehensive treatment of timing is provided in C. Zhu and S. Corson, 'A five phase reservation protocol (FPRP) for mobile ad-hoc networks,' in *Proc. IEEE INFOCOM* 1998, April 1998, incorporated by reference herein.

Figure 3:
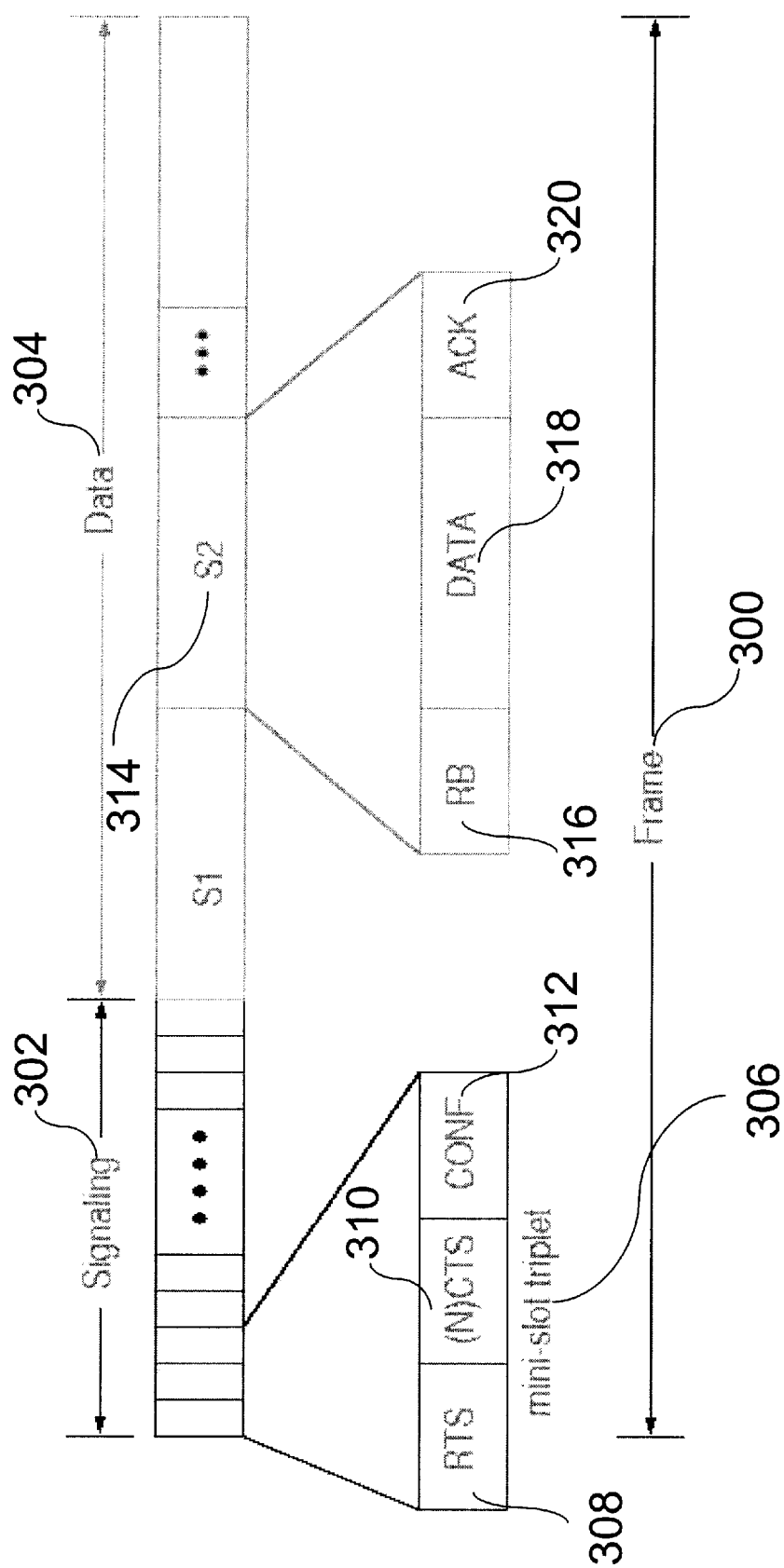
FIG. 3 is a frame diagram depicting the frame structure used for unicast communications with the present invention.

The frame structure used for unicast transmissions is depicted in FIG. 3. The frame 300 is divided into subsections, a signaling subsection 302 and a data subsection 304. The signaling subsection 302 comprises a plurality of minislot triplets 306. Each of the minislot triplets includes a request to send minislot 308, a (not) clear to send minislot 310, and a confirmation minislot 312. Each of the data slots 314 includes a receive beacon minislot 316, a data payload) sub-slot 318, and an acknowledgement minislot 320. During signaling, the nodes contend for slots in the data subsection 304. A node seeking to reserve data slots 314 can transmit a request to send signal in the request to send minislot 308, while nodes that receive the request to send signal can transmit a (not) clear to send signal in the (not) clear to send minislot 310 of the same minislot triplet 306. If the node that transmitted the request to send signal receives a clear to send signal in the (not) clear to send minislot 308, it transmits a confirmation signal in the confirmation minislot 312 of the minislot triplet 306. The exact mechanism by which these control packets are exchanged constitutes the reservation process at the MAC layer, and will be discussed in more detail below. Each data slot 314 also contains two control minislots, the receive beacon minislot 316 and the acknowledgement minislot 320. These minislots and their respective signals are used by the receiving nodes that have already reserved the specific slot. Their functionality will be explained below.

Before explaining the details of the use of the frame structure, the mechanism by which data slots are classified will be described. This discussion applies equally to the unicast frame structure and the broadcast frame structure. Each node within the system of nodes maintains a database with entries representing the current local status of the data slot reservations. The table below provides the classifications used in either the unicast or broadcast situation:

| Slot Classification | Usage |
| --- | --- |
| Reserved for Transmission (RT) | This slot is reserved for the transmission of packets. |
| Reserved for Reception (RR) | This slot is reserved for the reception of packets. |
| Free for Transmission (FT) | This slot may be used to transmit, but not to receive packets. This classification occurs when there is a neighboring node that uses this slot to transmit. |
| Free for Reception (FR) | This slot may be used to receive, but not to transmit packets. This classification occurs when there is a neighboring node that uses this slot to receive. |
| Free for Transmission or Reception (FTR) | This slot may be used to receive or transmit. This classification occurs when there are no neighboring nodes using it to transmit or receive. |

In order to provide an explanation of the reservation mechanism and its use with the table above, take the example where a node desires to reserve data for unicast transmission. The node selects which slots to attempt to reserve from the set of free for transmission and free for transmission or reception slots. The selection may be made in any desired manner, and is preferably made by random selection. During the signaling part of the frame, the node picks a minislot triplet and sends a request to send signal in the request to send minislot 308. For purposes of this discussion, a p-persistent policy of conflict resolution is assumed. In the request to send signal, the node specifies its identity, the identity of an intended receiver node, and the data slots to be reserved. The node knows that it has reserved the slots if it receives a clear to send signal in the (not) clear to send minislot 310 of the minislot triplet. If this is the case, the node marks the data slots as reserved for transmission in its internal slot classification database (table) and replies with a confirmation message in the confirmation minislot 312 of the minislot triplet. The confirmation message includes the identity of the node sending the confirmation message, the identity of the node which sent the request to send signal, and the data slots available for reservation. It is worth noting that it is possible that the data slots available for reservation may be subset of the data slots to be reserved. In this case, the node which sent the request to send can determine the desirable course of action, i.e., whether to cancel the reservation or to accept the subset of data slots and to later re-transmit the data for which data slots could not be reserved. If the node receives a not clear to send signal or senses a collision in the (not) clear to send minislot 310, the reservation was unsuccessful, and therefore the node remains silent during the subsequent confirmation minislot 312. Note that a collision is declared in a slot if a node detects power above some predetermined threshold in the slot, but is unable to decode a packet.

A node that correctly receives a request to send signal in the request to send minislot 308 of the minislot triplet, and is the intended receiver of the request to send signal, checks its slot classification database regarding the slots that it needs to reserve. If the slots are among the node's free for reception, or free for transmission or reception slots, the receiving node will issue a clear to send signal in the (not) clear to send minislot 310 and will await a confirmation signal in the confirmation minislot 312 from the transmitter. At this point, the node marks the slots as reserved for reception in its database. Note that, as mentioned above, the node may find only a subset of the requested slots among its free for reception or free for transmission or reception slots, in which case the node only acknowledges these to the transmitter. If none of the requested slots are in the free for reception or free for transmission or reception sets, the node remains silent during the (not) clear to send minislot 310.

A node that correctly receives a request to send signal in the request to send minislot 308 of a minislot triplet and is not the intended receiver of the request to send checks its database to determine whether any of the requested slots are in its reserved for reception set. If not, the node remains silent in the paired (not) clear to send minislot 310 and awaits a confirmation signal from the transmitting node in the confirmation minislot 312. When the node receives the confirmation signal from the transmitter, it marks the slots defined in the confirmation signal as free for transmission. If any of the slots in the request to send signal (packet) are classified as reserved for reception in the node's database, the node issues a not clear to send signal in order to jam any clear to send signal possibly issued by the intended receiver of the request to send signal. This action protects reservations that have already been successfully established earlier in the contention phase.

A node that detects a collision in a request to send minislot 308 issues a not clear to send signal in order to protect any slots classified in its database as reserved for reception, as well as any slots which the request to send signal may be requesting for another receiver. In other words, when the node cannot determine what is being requested for reservation, it takes the conservative approach of preventing any reservations, since the possibility exists that what is being requested will cause interference in slots it has reserved for reception.

Figure 4:
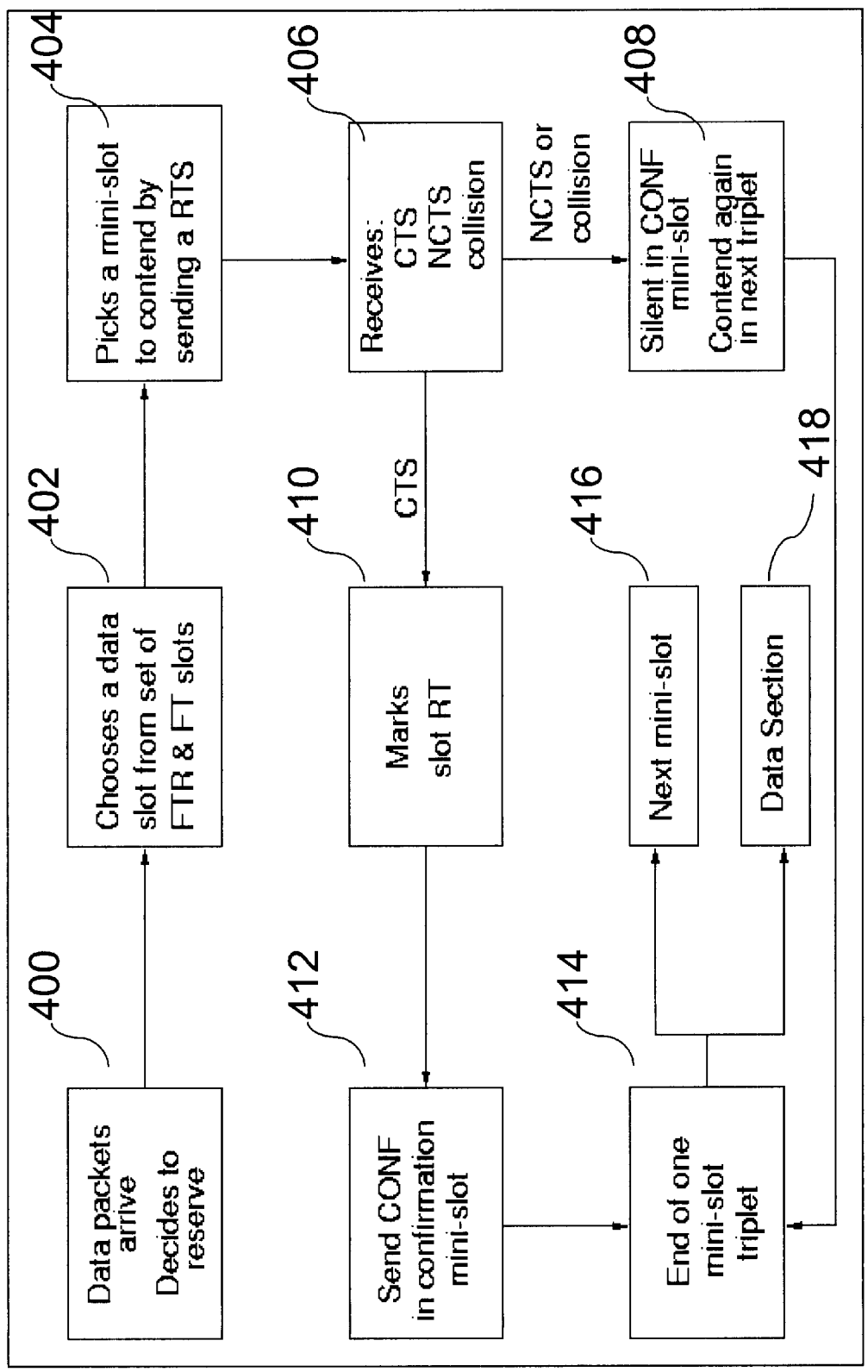
FIG. 4 is a flow diagram depicting the actions occurring relative to a transmitter node during unicast communications with the present invention.
Figure 5:
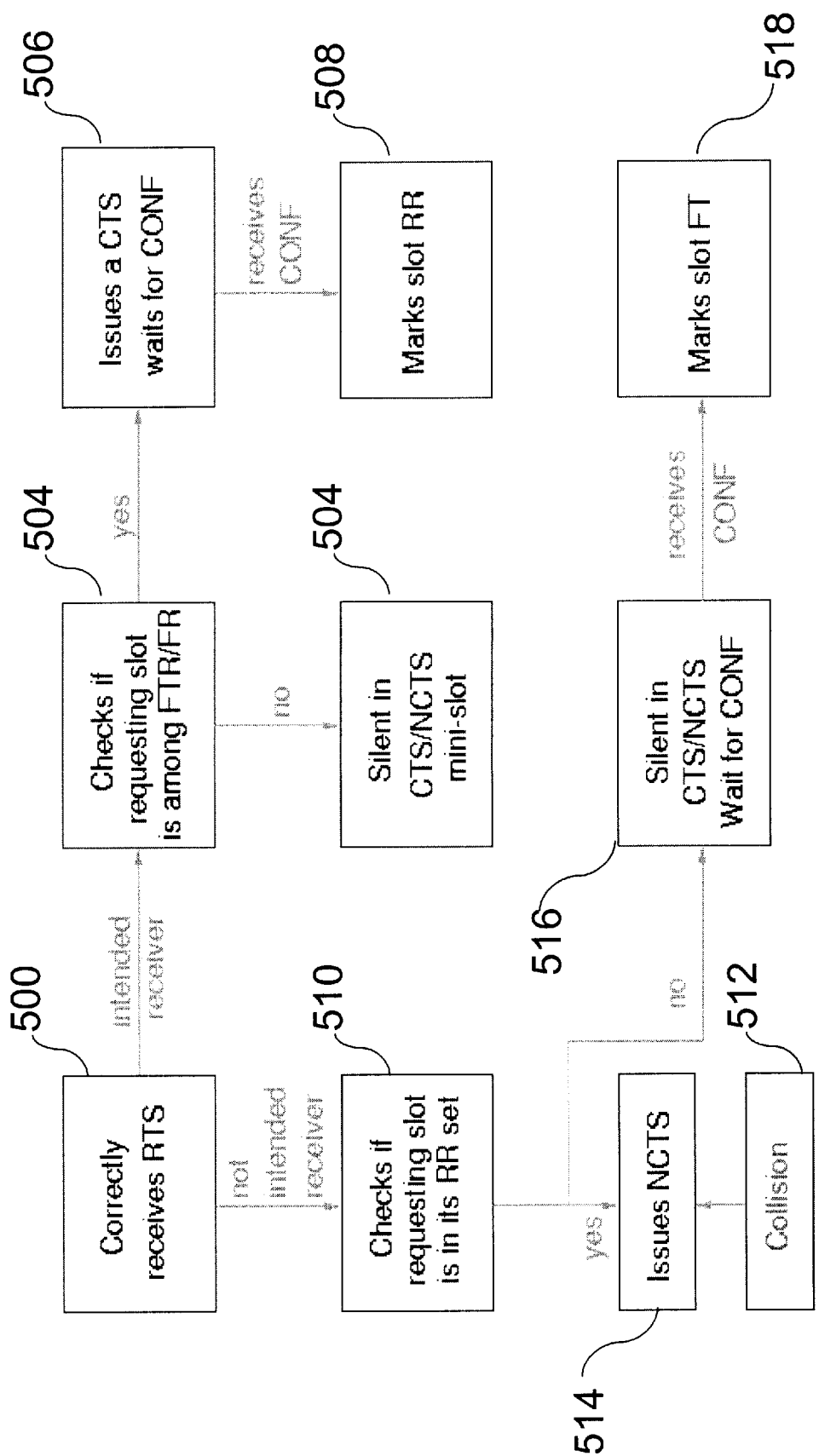
FIG. 5 is a flow diagram depicting the actions occurring relative to a receiver node during unicast communications with the present invention.

Flow charts depicting the process involved in unicast transmission and reception are depicted in FIGS. 4 and 5, respectively. These figures are intended to aid in providing a better understanding of the present invention. First, the transmission reservation technique is described.

The reservation scheme is broken into two sections, the first comprising a plurality of minislot triplets 306, in which the initial reservations take place. In the second section involving the data slots 314, a follow-up check is performed on the initial reservations, to ensure that the reservations are valid prior to the transmission of data. In the context of the apparatus of the present invention, the steps in the transmission reservation technique are in the form of means, typically a command sequence, operating within a data processing system 100. As depicted in FIG. 4, when data packets arrive, or are made available, at the transmitting node, a decision to reserve at least one data slot is made 400. The node next selects a data slot from the set of slots available for transmission for reservation 402. In order to do so, the node typically refers to its data slot classification database to determine which slots are free for transmission or reception, or which are free for transmission, and then selects the appropriate slots for reservation. Next, the node transmits a request to send data in the request to send data minislot 308 of a minislot triplet, corresponding to the at least one data slot in which a reservation is desired 404. Note that the request to send can be sent in any minislot triplet, and that it includes the identity of the transmitting node as well as the slots in which a reservation is desired. After transmitting the request to send signal, the transmitting node receives (as a result of transmitting the request to send data) a (not) clear to send signal in the (not) clear to send minislot 310 indicating whether the data slot is available for sending data 406. The transmitting node then determines whether the (not) clear to send signal indicates a clear to send status, a not clear to send status, or a collision. When the (not) clear to send signal indicates either a not clear to send status or when a collision is received, the transmitting node remains silent in the confirmation minislot 312 and awaits another (typically the next) minislot triplet to attempt the reservation again 408. On the other hand, when a clear to send signal is received, the node indicates that the data slot, for which the request to send was transmitted, is reserved for transmission 410. This typically occurs through the use of the slot classification database at the node. Next, the transmitting node sends a confirmation signal in the confirmation minislot 412. This marks the end of the minislot triplet 414, and the node may repeat this process in the next minislot 416 or may transmit its data 418.

Later, during the transmission of the data, the transmitting node, at each data slot reserved for transmission, awaits reception of a receive beacon containing the identity of the transmitting node in the receive beacon minislot 316 of data slots 314 for which a reservation was made by the transmitting node. If a collision is received in the receive beacon minislot 316; if a receive beacon containing the identity of another apparatus is received in the receive beacon minislot 316; or if no receive beacon is received containing the identity of the apparatus in the receive beacon minislot 316, the transmitting node cancels the reservation and remains silent until the next frame to attempt another reservation for transmission of its data. On the other hand, when a receive beacon is received correctly in the receive beacon minislot 316, the transmitting node transmits the data in the reserved data slots and awaits receipt of an acknowledgement in the acknowledgement minislot 320 of the data slot 314. If no acknowledgement is received in the acknowledgement minislot 320, the node attempts another reservation for transmission of the data in the next frame.

The reservation process from the point of view of the receiver is depicted in FIG. 5. During the reservation process, e.g. when the apparatus is the intended receiver of the data, and after a request to send signal is correctly received 500, the receiving node first checks to determine whether the data slot is a slot in which the apparatus is free to receive. This is accomplished by checking the receiving node's data slot classification database to determine whether the requested slot (slots) is (are) among its free to transmit or receive, or its free to receive slots 502. If the slot is not one in which the node is free to receive, the node remains silent in the (not) clear to send slot and in the confirmation slot 504. On the other hand, if the slot is one in which the node is free to receive, the node issues a clear to send signal in the (not) clear to send minislot and then awaits a confirmation signal in the confirmation minislot 506. When a confirmation signal is received in the confirmation minislot 312, the node marks the slot as reserved for reception 508 in its slot classification database. When the node is not the intended receiver of the data, it checks to determine whether the slot requested is reserved for reception 510. If the slot is reserved for reception, or if a collision is received in the request to send minislot 512, the node transmits a not clear to send signal in the (not) clear to send minislot 514. If the slot is not reserved for reception and if no collision is received in the request to send minislot 512, the node remains silent in the (not) clear to send minislot and awaits a confirmation signal in the confirmation minislot 516. Upon reception of a confirmation signal in the confirmation minislot 312, the node marks the slot free for transmission in its data slot classification database 518.

Later, during the transmission of the data slots, the node, at each data slot reserved for reception, sends a receive beacon containing the identity of the node for which the reservation was made. The receive beacon is sent in the receive beacon minislot 316 of the data slots for which the reservation was made. The node then awaits reception of the data in the data slot 318 from the node for which the reservation was made. Once the data has been received in the data slot 318, the node sends an acknowledgement signal in the acknowledgement minislot 320 of the data slot 318.

Figure 6:
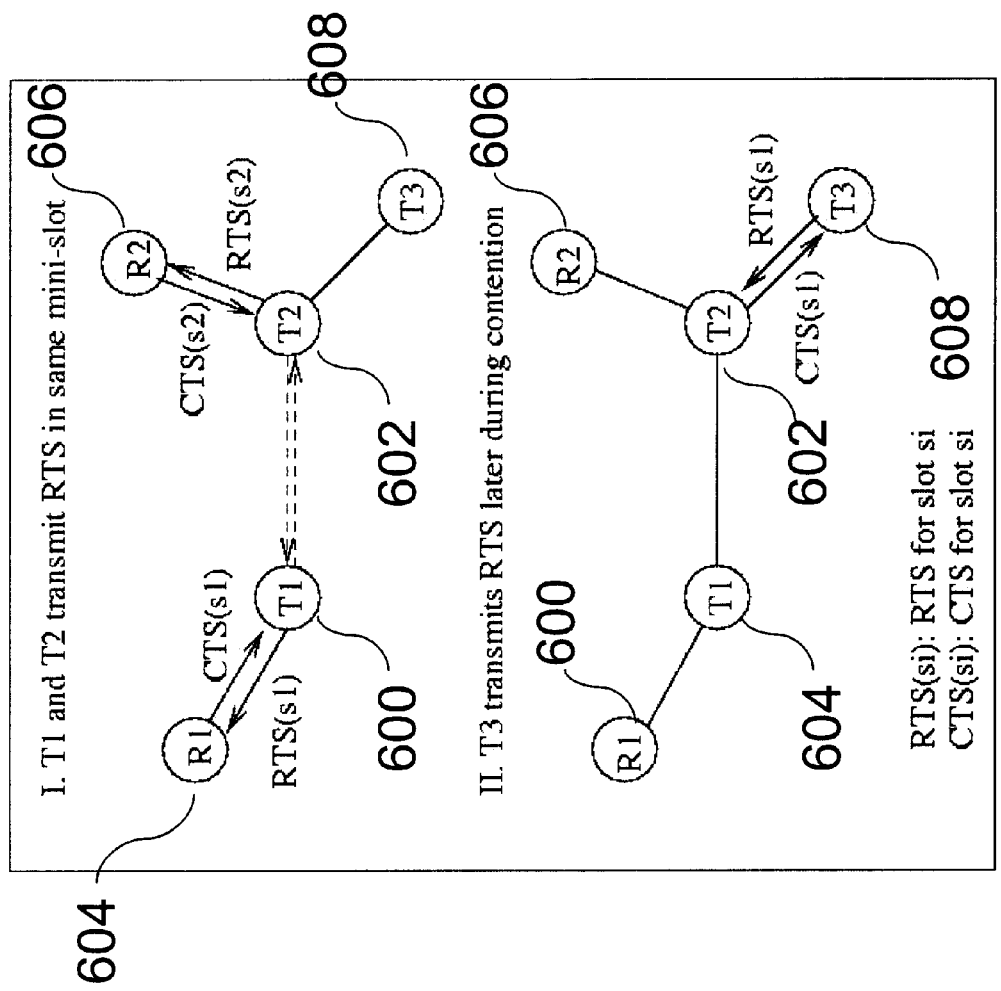
FIG. 6 is an illustrative diagram illustrating the definition of a deadlock situation as coined for the present invention.

Without confirmation of reservations in the data slots, procedure described above will still result in correct reservations of data slots, except potentially in the case of deadlocks. A deadlock here is defined as a situation in which two nodes without any common neighbors transmit request to send signals in the request to send minislot of the same minislot triplet (i.e. at the same time) and therefore cannot hear each other's transmission. In this case, one or both of the transmitters may obtain a successful reservation in the current minislot; while either may become a receiver for the other's transmit data slots later in the contention period. An example of this situation is depicted in FIG. 6. Nodes T1 600 and T2 602 transmit a request to send signal in the same minislot and successfully reserve slots s1 and s2, respectively. However, neither is aware of the other's reservation because each is out of range of the node from which the other received a clear to send signal, nodes R1 604 and R2 606, respectively. Later in the contention period, node T3 608 transmits a request to send signal to reserve slot s1 to node T2 602, which sends a clear to send signal because it has not marked slot s1 as free for transmission in its slot classification database. In this situation, a potential collision can occur at node T2 602 if nodes T3 604 and T1 600 transmit simultaneously in slot s1. The present invention deals with this situation through the use of the receiver beacon (discussed previously) during the data slot such that a collision will not occur, and node T3 608 will be able to transmit while node T1 600 will contend for another data slot. Note that a deadlock can only occur if the two nodes T1 600 and T2 602 do not have a common neighbor. Otherwise a request to send collision would occur at that neighbor, which would respond with a not clear to send signal which would cancel the reservation attempts of both nodes.

Next, more detail regarding the use of the receiver beacon minislot 316 and the acknowledgement minislot 320 within the data slots 314 of the data subframe 304 is described. A node that has reserved a specific slot as reserved for reception in its slot classification database will transmit a receiver beacon in the receiver beacon minislot 316 at the beginning of the data slot 314. The receiver beacon contains the corresponding transmitter's identity. This beacon is useful in several ways; and particularly in the resolution of deadlocks and in situations where the nodes are mobile. Correct reception of the receiver beacon by the corresponding transmitter verifies that a deadlock has not occurred in the specific data slot and that the receiver will be able to receive the data (payload) collision free. If the transmitting node detects a collision in the receiver beacon minislot 316, it recognizes that either a deadlock has occurred for that slot, or that other receiving nodes have strayed into its neighborhood. In either case, the transmitting node knows that its transmission will likely jam the reception at some neighboring node, and therefore will opt not to transmit data and will compete anew for data slots. Referring again to FIG. 6, in the beginning of slot s1, nodes R1 604 and T2 602 will transmit receive beacons, causing a collision at node T1 600. Consequently, node T1 600 will defer transmission and will instead try to contend for a data slot 314 again in the next frame 300. Meanwhile, node T3 608 will successfully transmit in slot s1.

In addition, to the above, the transmission of a receiver beacon by a receiving node re-affirms the reservation to the neighbors of the receiving node, who will mark the slot as free to receive in their slot classification database and will avoid contending for it. This is especially useful under mobility conditions, since new nodes may enter the receiving node's vicinity and should be notified that the slot is already reserved for reception by a neighboring node. Finally, if the transmitting node does not hear a receiver beacon or hears a receiver beacon containing an identity different than its own, it knows that the receiving node has left its vicinity, or is otherwise unable to receive its transmission.

In order to combat adverse channel conditions at the MAC layer, such as deep fades, an acknowledgement minislot 320 is provided in the after the data sub-slot 318 in each data slot 314. If the receiving node correctly received a data packet in the data sub-slot 318 of a reserved slot, it responds with an acknowledgement signal in the acknowledgement minislot 320 in order to notify the transmitting node of its correct reception.

b. Correctness of the Techniques for Unicast Transmission

This subsection provides a relatively simple proof of the correctness of the unicast reservation mechanism disclosed above. The proof assumes the absence of deadlocks. That is, no two nodes that have no common neighbors transmit request to send signals at the same time. Note also that the proof considers a static "snapshot" of the network. Obviously, when mobility is considered, there may be cases where reservations are not performed correctly and where packets collide in the data slots. However, if the duration of the frame is small compared to the maximum relative speed in the network, the probability of incorrect reservations is very small. The maintenance of slot reservations many frames after their initial allocation will be affected to a much larger degree since the effect of mobility is more pronounced in that case.

Theorem

If any two nodes have at least one common neighbor, then unicast reservations are performed correctly, that is when a slot is unsuccessfully reserved, it is impossible for the data packet to experience collision.

Proof

A slot s0 is successfully reserved when the receiver node (R) receives a collision-free request to send signal and a subsequent confirmation signal, while the sender node (S) receives a collision-free clear to send, and both the request to send signal and the clear to send signal contain s0 in their fields. For R to receive a request to send signal, no node other than S in the neighborhood of R (N(R)) sent a request to send signal (including R itself), hence no node in N(R) will reserve any slot for transmission in the current request to send/(not) clear to send/confirmation minislots. For R to send a clear to send signal, s0 must be in the sets of free for reception, or free for transmission or reception, slots and hence no node in N(R) reserved s0 for transmission during past contention mini-slots, in the absence of deadlocks. Otherwise, R would certainly have heard the relevant request to send and confirmation signals and would have classified s0 as free or transmission. For the rest of the contention part of the frame, if R receives a request to send signal that contains s0, or detects a collision of request to send signals, it will transmit a not clear to send signal that jams any clear to send signal possibly received by the sender node of the request to send signal, thus preventing the sender node from reserving s0. Therefore, by the end of the contention period, S will be the unique transmitter for slot s0 in N(R).

On the other hand, once R has transmitted a clear to send signal, S will receive it collision free in the paired (not) clear to send slot if and only if S's request to send signal was received collision-free from all nodes in N(S), for otherwise some node in N(S) would have transmitted a not clear to send signal to jam the clear to send signal, and the slots requested in S's request to send signal were not among the reserved for reception slots of any of the receivers of the request to send signal, or else, again some node in N(S) would have transmitted a not clear to send signal to jam S's reception of clear to send signal. Thus, upon reception of confirmation signal, all nodes in N(S) will mark the slots contained in the request to send signal as free for transmission and none will become a receiver for s0 during subsequent contention mini-slots. Therefore, by the end of the contention period, R will be the unique receiver in N(S). QED.

c. Further Discussion Regarding the Deadlock Probability

Figure 7:
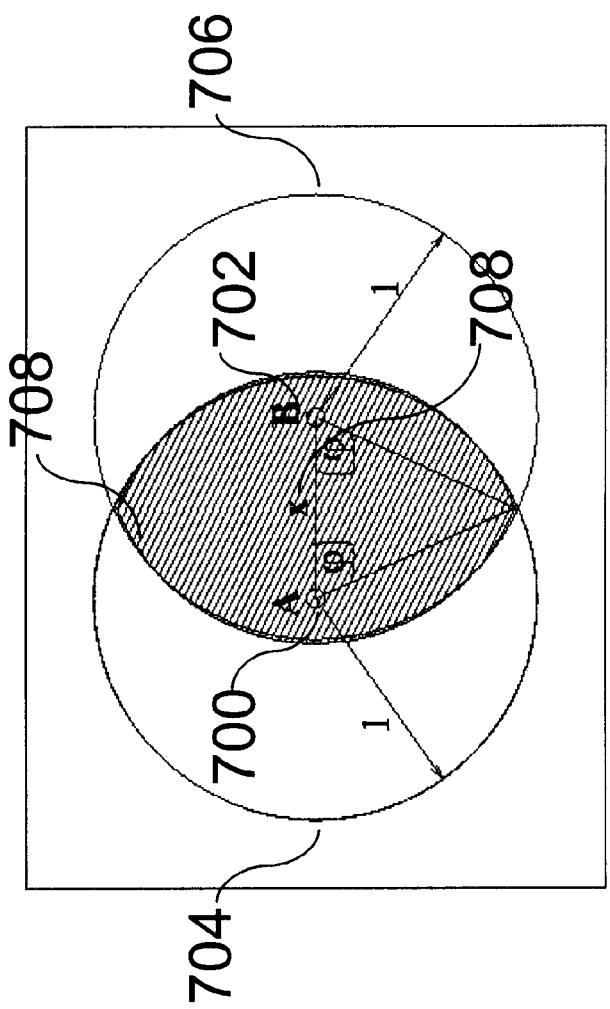
FIG. 7 is an illustrative diagram for developing a measure of the probability that two neighboring nodes do not have any common neighbors.

As previously mentioned, this protocol does not guarantee collision-free unicast scheduling if a deadlock occurs (although no collision takes place, even in that case). A deadlock was previously defined as a situation in which two neighboring nodes transmit request to send signals at the same time, and the transmitting nodes do not have any common neighbor to notify them via a not clear to send signal that they should abandon their reservation procedure. Here, a measure of the probability that two neighboring nodes do not have any common neighbors, based on geometric arguments is provided. To this end, consider two neighboring nodes that have a unit range and that are at a distance x apart (hence x<1). This geometric situation is presented in FIG. 7, depicting node A 700 and node B 702 in a neighbor relationship. The circles 704 and 706 indicate the transmission range of node A 700 and node B 702, respectively. The shaded area 708 indicates the region of transmission overlap. Note that if a third node is a neighbor of node A 700 and is located in the shaded area 708, it is also a neighbor of node B 702. In view of FIG. 7, it is clear that the probability that a third node is not a neighbor of node B 702, given that it is a neighbor of node A 700 is given by:

$$P(x) = 1 - \frac{\text{shaded area}}{\pi}. \tag{1}$$

It is also a simple matter of geometry to show that the shaded area is given by:

$$\text{shaded area} = 2\Phi - \sin(2\Phi), \tag{2}$$

where $\Phi$ 710 is defined in FIG. 7 and is related to x 712 through:

$$\cos(\varphi) = \frac{x}{2}. \tag{3}$$

Now, given that nodes A 700 and B 702 are neighbors, it may be assumed that their distance x 712 is uniformly distributed in [1, 0], and un-condition P(x) from x. Doing so yields for the probability that a third node is not a neighbor of one of node A 700 or B 702, while being a neighbor of the other:

$$P_0 = 0.3115. \tag{4}$$

Finally, for randomly positioned radios, it can be assumed that each node has d neighbors uniformly distributed within its range, where d can be, e.g. the average degree of the network. Then, the probability that node A 700 and B 702 have no common neighbors is:

$$P[\text{2 Neighbors Have No Common Neighbors}] = P_0^{2d-2}. \tag{5}$$

It is now clear that for even relatively small network degrees, the above probability is quite small, e.g. for an average network degree of four, it becomes negligible. It should be added that for the present invention, to schedule two conflicting transmissions in a neighborhood, additional conditions must coincide: the two neighboring nodes should transmit a request to send signal at the same time, and later a third node should successfully send a request to send signal to one of the two nodes for the slot already reserved for transmission by the other. The coincidence of all these event is likely to be quite rare.

d. Measurement-Based Reservation Adjustment

While the reservation scheme discussed to this point does not prohibit a node with an ongoing reserved connection from reserving additional timeslots for the current connection, it is not trivial "when" to trigger such an adjustment. This is because of the unpredictability of the traffic fluctuation. Therefore, it is necessary to be able to dynamically adjust the reservation level by continuously observing the traffic rate and the queue length associated with the traffic.

The technique is as follows:

1. Let R be the current reservation bandwidth (slots/frame);
2. Let $B_i$ denote the queue length at the end of i-th frame (slots);
3. If $B_i > a*R$ for some constant a (>=1), the node attempts to reserve additional $B_i - R$ slots during the signaling phase of (i+1)-th frame;
4. Let U denote the number of unused timeslots during a frame; and
5. If U is nonzero for N consecutive frames, the node releases the average number of unused slots per frame (during the last N frames) in the next frame.

The value used for the constant a depends on the delay requirement at this node. For example, if the delay and jitter requirements are stringent, a value close to 1 must be used. The value used for N depends on the degree of traffic fluctuation. If the input traffic fluctuation is high, a larger value is desirable. Otherwise, a small value is desirable (e.g. 3).

e. Example Results

FIG. 8(*a*) and FIG. 8(*b*) present throughput and delay performance comparisons, respectively, for the present invention versus IEEE 802.11. Note that IEEE 802.11 is an asynchronous MAC, and that it is considered the current standard MAC for ad-hoc networks. With regard to the figures, a network of 25 nodes was considered, arranged in a square mesh of 5 by 5 nodes, such that the nodes inside the mesh have 4 neighbors each, while nodes on the border have 3 neighbors each. Nodes on the corners have 2 neighbors each. A mesh network was considered, rather than a fully-connected network, in order to study the spatial re-use benefit of IEEE 802.11 versus that of the present invention. The ns-2 simulation tool was used with a nominal bandwidth of 2 Mbit/sec. Note further that IEEE 802.11 achieves an aggregate throughput of 3.5 Mbit/sec, while the present invention achieves 8.5 Mbit/sec. Therefore, IEEE 802.11 has a spatial re-use factor of 1.5, while the present invention has a spatial re-use factor greater than 4.0. Further, IEEE 802.11 exhibits very small delay when the offered load is small, but as the load increases, the delay increases and surpasses the delay of the present invention. The delay exhibited by the present invention is higher at low offered loads, but increases much slower and tends to be constant for high offered loads. This behavior is similar to that of all TDMA protocols.

(5) The Broadcast Frame Structure and Transmissions Therein a. Discussion

The technique for broadcast transmissions is a TDMA-based distributed reservation protocol for scheduling broadcast transmissions in mobile ad-hoc networks. An object of the technique is to perform broadcast reservations in a manner that ensures data losses due to collisions are negligible. In summary, the technique for broadcast transmissions is characterized by the following features: (1) a two-step signaling process in which reservation signaling is completely decoupled from the data in the frame, as is the case in the unicast technique discussed above; (2) a multiple minislot reservation request phase within a reservation minislot to prevent deadlocks; (3) special signaling at the beginning similar in function to the receive beacon discussed with regard to the unicast technique, which serves as a second check on the reservations immediately prior to the data transmission; (4) an optimization to improve spatial re-use of the communication channel; and (5) an adaptive adjustment of the reservation level based on the measured traffic rate for variable rate connections, which was discussed above as well.

Most MAC protocols for wireless ad-hoc networks currently do not provide broadcast reservations. Instead, they rely on carrier sensing to transmit broadcast packets. However, carrier sensing is well-known to provide minimal protection against collisions because it assures that the medium is free at the transmitter and not at the receiver. On the other hand, broadcast packets are usually of great importance to an ad-hoc network, because they usually contain signaling information crucial to the maintenance of the network as well as to the traffic supported by the network. The most common example of broadcast packets is routing discovery/maintenance packets. If routing packets suffer very large losses, the overhead of the network increases dramatically and, unfortunately, the performance also drops. MAC protocols that support broadcast reservations are therefore expected to improve overall network performance by guaranteeing collision-free delivery of signaling packets.

On the other hand, broadcast reservations are wasteful of bandwidth when there is no broadcast traffic. The broadcast reservation techniques of the present invention are designed to take advantage of instances when there is no broadcast traffic at some wireless node that has reserved broadcast bandwidth. In this case, through proper signaling, the node is able to use the bandwidth to transmit unicast traffic instead, and additionally, neighboring nodes are able to re-use the same bandwidth for their own unicast transmissions.

As stated before, and as was the case with the unicast technique, the present invention uses a frame structure in which the length of the reservation signaling is independent of the data portion in each frame. Reservation requests occur in a reservation request phase within a reservation slot that spans multiple minislots. This assists in ensuring that the probability of deadlocks is very low, thereby preventing data losses. The deadlock situation and solution will be discussed in more detail below. Also, special signaling at the beginning of a data slot assists in improving the robustness of broadcast reservations in the situation of a mobile network. An optimization is also presented for increasing spatial reuse with unicast traffic.

Before discussing the broadcast techniques of the present invention in greater detail, several observations regarding their use will be made. First, it is important to note that for successful reception of a packet at a node in the receive mode, at most one of its neighboring nodes is allowed to transmit. This is equivalent to stating that a receiving node can have at most one transmitting node in its neighborhood. In other words, no two nodes may transmit a packet to a common receiver node. Also, two neighboring nodes can each transmit unicast packets (using the broadcast technique) if the intersection of the neighborhoods of the two transmitting nodes does not include any of the two receiving nodes. However, two neighboring nodes cannot transmit broadcast packets simultaneously. Finally, there can be at most one node transmitting a broadcast packet within a two-hop neighborhood. In other words, two nodes transmitting broadcast packets at the same time must be at least three hops away from each other.

It is also important to note that in general, with respect to the present invention, nodes are considered to communicate using broadcast packets. Unicast packets are considered as a special case of broadcast packets. Further, as was discussed with respect to the unicast technique, the nodes are considered to be synchronized with reference to a global clock (as required by TDMA-based protocols). This synchronization can occur through the use of guard bands, as previously mentioned, or through the use of a global positioning system (GPS) at each node, or by other means. Also, nodes are assigned unique identities (e.g. 48-bit Ethernet addresses). Also, as mentioned previously, nodes are equipped with half-duplex radios, which allow them either to transmit or receive at a given time, but not to do both simultaneously. Further, as mentioned previously, nodes do not have capture ability, i.e. reception of more than one transmission results in a collision. Additionally, the links used are generally considered to be bi-directional.

Figure 9:
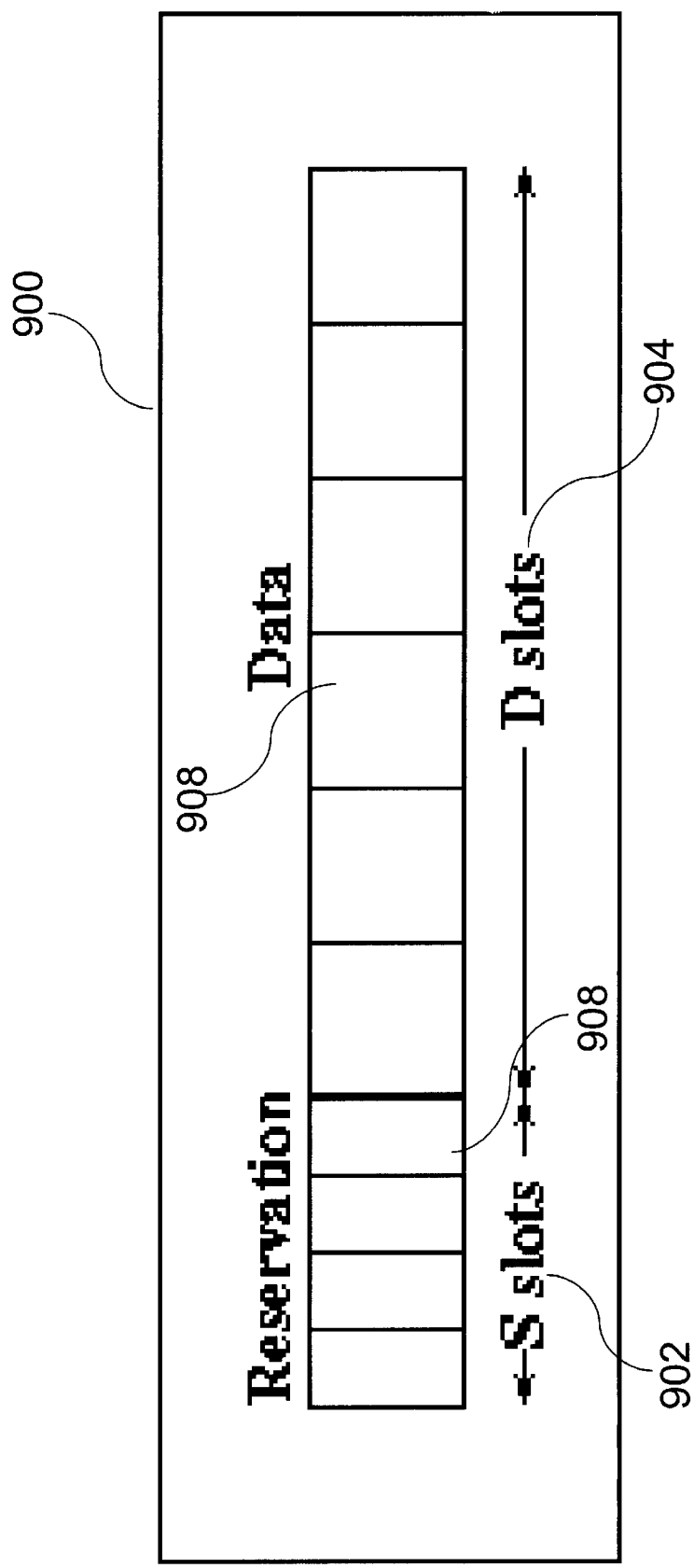
FIG. 9 is a frame diagram depicting the frame structure used for broadcast communications with the present invention.

Now, greater detail will be provided with regard to the broadcast technique of the present invention. For simplicity of discussion, a static ad-hoc network will be considered initially. Modification of the technique to handle mobility will be discussed subsequently. The basic frame structure used for the broadcast reservation technique of the present invention is depicted in FIG. 9. The frame 900 is divided into a signaling subframe 902 and a data subframe 904. The signaling subframe 902 comprises a plurality of reservation slots 906 and the data subframe comprises a plurality of data slots 908. Each of the reservation slots 906 is subdivided into a plurality of minislots.

Figure 10:
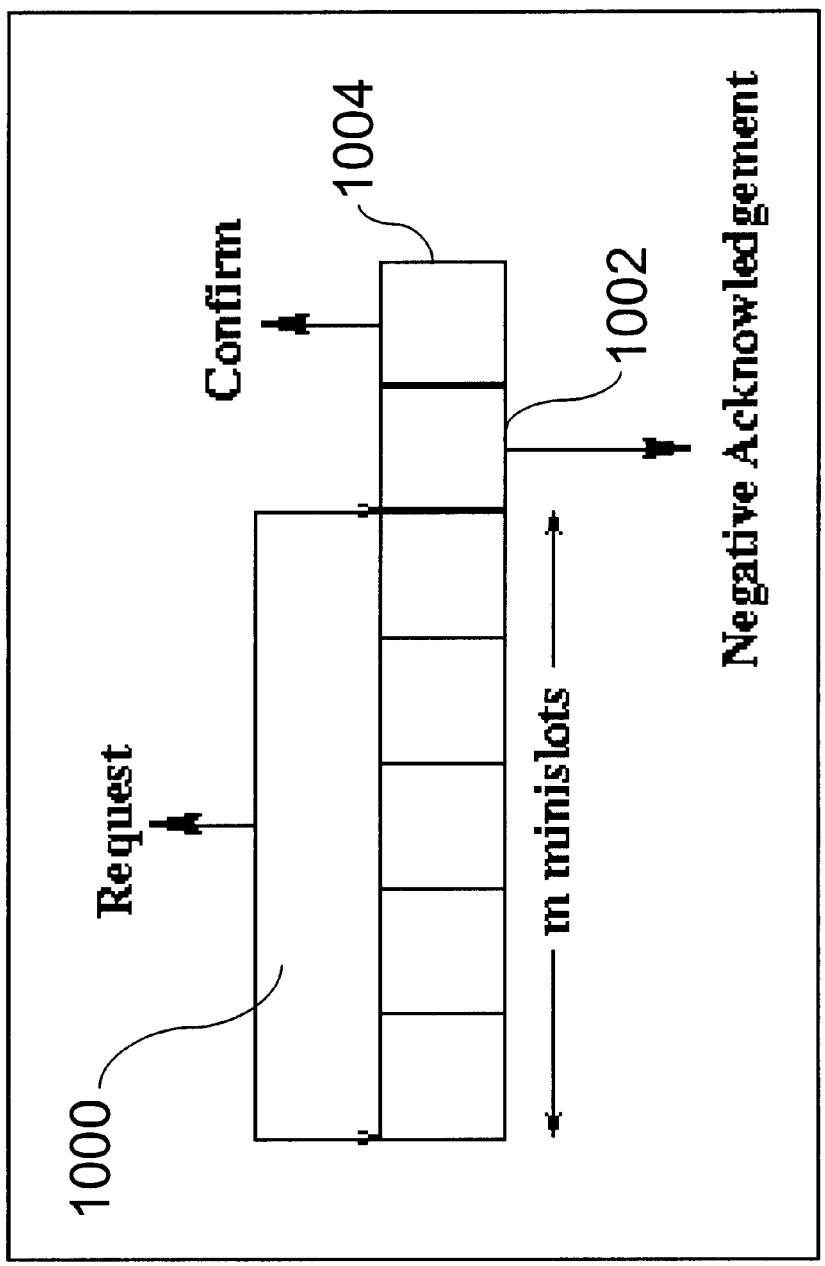
FIG. 10 is a frame diagram depicting, in detail, the structure of each reservation slot shown in FIG. 9.

The individual reservation slots 906 are as depicted in FIG. 10. As shown in FIG. 10, a reservation slot 906 comprises a plurality of request to broadcast minislots 1000, a negative acknowledgement minislot 1002, and a reservation confirmation minislot 1004.

As with the unicast technique described previously, each node maintains a slot classification table to store the classification of each data slot. When a node knows about a reservation, an entry is created in the slot classification table. The entry includes the slot number, the identity of the reserving node, and the reservation classification (see the table above). In this case, the reservation classifications are from the set, reserved for broadcast transmission, reserved for broadcast reception, free for transmission or reception, and free for reception. When a reservation is no longer valid (e.g. the data slot for which a reservation was made has passed, the reservation has been canceled, or when the data slot corresponding to the entry is unused in the frame), the corresponding entry is deleted from the slot classification table.

Now, the reservation signaling for the broadcast technique will be described. A node that has broadcast data to transmit first receives a data slot by means of reservation signaling. Before a successful reservation is made, a node may have to contend in one or more reservation slots 906. In each of the reservation slots, the contending nodes go through a three-phase dialogue, where the phases include the reservation request phase, a negative acknowledgement phase, and a reservation confirmation phase. A brief overview of the process occurring within a reservation slot 906 is as follows. A node X contending in a reservation slot 906 first sends a reservation request to its neighbors in a reservation request minislot 1000. The neighbors respond back with a negative acknowledgement in the negative acknowledgement minislot 1002 if node X's request conflicts with already reserved slots or with other requests. Upon receiving a negative acknowledgement (or nose in the case of a collision), node X repeats the whole process again in another reservation slot 906. The phases within each reservation slot in the broadcast portion of the present invention are similar to those that occur in the unicast portion. Each of the phases will be described in greater detail below. Recall that it is assumed that all nodes in the system are synchronized. Therefore, all of the nodes enter the reservation process synchronously. Each of the phases will be briefly described below:

(i) Reservation Request Phase

In the reservation request phase, all nodes contending for a reservation slot randomly choose a subset k (<m) among m reservation minislots provided, in which to transmit request to broadcast packets. Each request to broadcast packet carries the identity of the requesting node along with the data slot to be reserved. Note that each contending node transmits k request to broadcast packets with probability 1. The reason for transmitting k request to broadcast packets is to minimize the probability of deadlock. A deadlock is said to occur if two conflicting broadcasts are scheduled in the same data slot and the sending nodes do not detect the conflict. This situation is similar to that described previously relative to the unicast situation. In the event of a deadlock, data packets get lost until the deadlock or the error due to the deadlock is detected. For example, consider a scenario where two neighboring nodes (X and Y), with no common receiver, simultaneously try to reserve the same data slot in the request phase. If there was only one minislot for the reservation request and assuming both X and Y transmit a request to broadcast in that minislot with probability 1, then neither X nor Y would perceive a conflict because they cannot both transmit and receive at the same time. Therefore both X and Y reserve the same slot, which causes a deadlocked situation. A possible approach for avoiding such deadlocks is to allow the contending nodes to transmit a request to broadcast with some probability p (<1). However, for the deadlock probability to be very low, the value of p also has to be very low, resulting in poor channel utilization in normal cases (i.e., when deadlock cannot occur). Hence, it is preferable to use a reservation request phase spanning m (>1) minislots and to allow contending nodes to transmit a request to broadcast in only k (<m) randomly chosen minislots. Now deadlock can happen only if each node of every pair of neighboring contending nodes selects the same k minislots during the request phase. Note that m and k are considered to be parameters of the protocol presented herein. Thus, by choosing appropriate values of m and k, the deadlock probability can be made negligible without reducing channel utilization. A more thorough analysis of the deadlock probability is given further below.

(ii) Negative Acknowledgement Phase

As has been mentioned several times to this point, for a conflict-free broadcast schedule, two nodes can broadcast in the same slot if and only if they are at least three hops away from each other. In other words, for broadcasts from any two nodes to conflict they have to be within the two-hop neighborhood of each other. Therefore, a common neighbor of such a pair of nodes can potentially be used to report the conflict to the contenders. In our protocol, a node reports a potential conflict via a negative acknowledgement (NACK) packet (signal). A negative acknowledgement packet is transmitted if one of the following events occurs during the reservation request phase: (i) if a node experiences a collision or if it finds that the requested slot is already reserved; or (ii) if a contending node detects a deadlock. Note that deadlock is detected by a contending node if it overhears one or more request to broadcast packets during the request phase.

(iii) Reservation Confirmation Phase

As the title suggests, confirmation of successful reservation is reported in this phase. A node that participates in the request phase is considered successful if none of its neighbors transmit a negative acknowledgement packet during the negative acknowledgement phase. A successful node notifies its reservation to its one-hop neighbors with a confirmation packet (signal). Nodes that receive a confirmation packet update their slot classification tables appropriately.

Previously, it was mentioned that a static network topology was being assumed. Now, this assumption is relaxed so that the case of mobility is taken into account as well as further improvements in the robustness of the protocol against deadlocks. When nodes are static, it is sufficient for a node to reserve a data slot once and keep using that slot as long as it has data to transmit (provided that there are no deadlocks). However, this is not true in the case of a network of mobile nodes. Recall that for a conflict-free broadcast schedule, there must be at most one broadcast sender within a two-hop neighborhood. In the presence of mobility, it is likely that a broadcasting node will move into the two-hop neighborhood of another broadcast sender resulting in broadcast collisions. Hence, the broadcast schedule has to be adaptive to topology changes caused by mobility. Special signaling within each data slot is introduced in order to ensure conflict-free broadcasts. The basic idea is the same as it is in the unicast case described above—to confirm the reservation before transmitting in a data slot. Essentially, when a sender node realizes that its broadcast is in conflict with another sender node's broadcast through the special signaling at the beginning of a data slot, it cancels its reservation and attempts to acquire a data slot in the next frame through reservation signaling.

Figure 11:
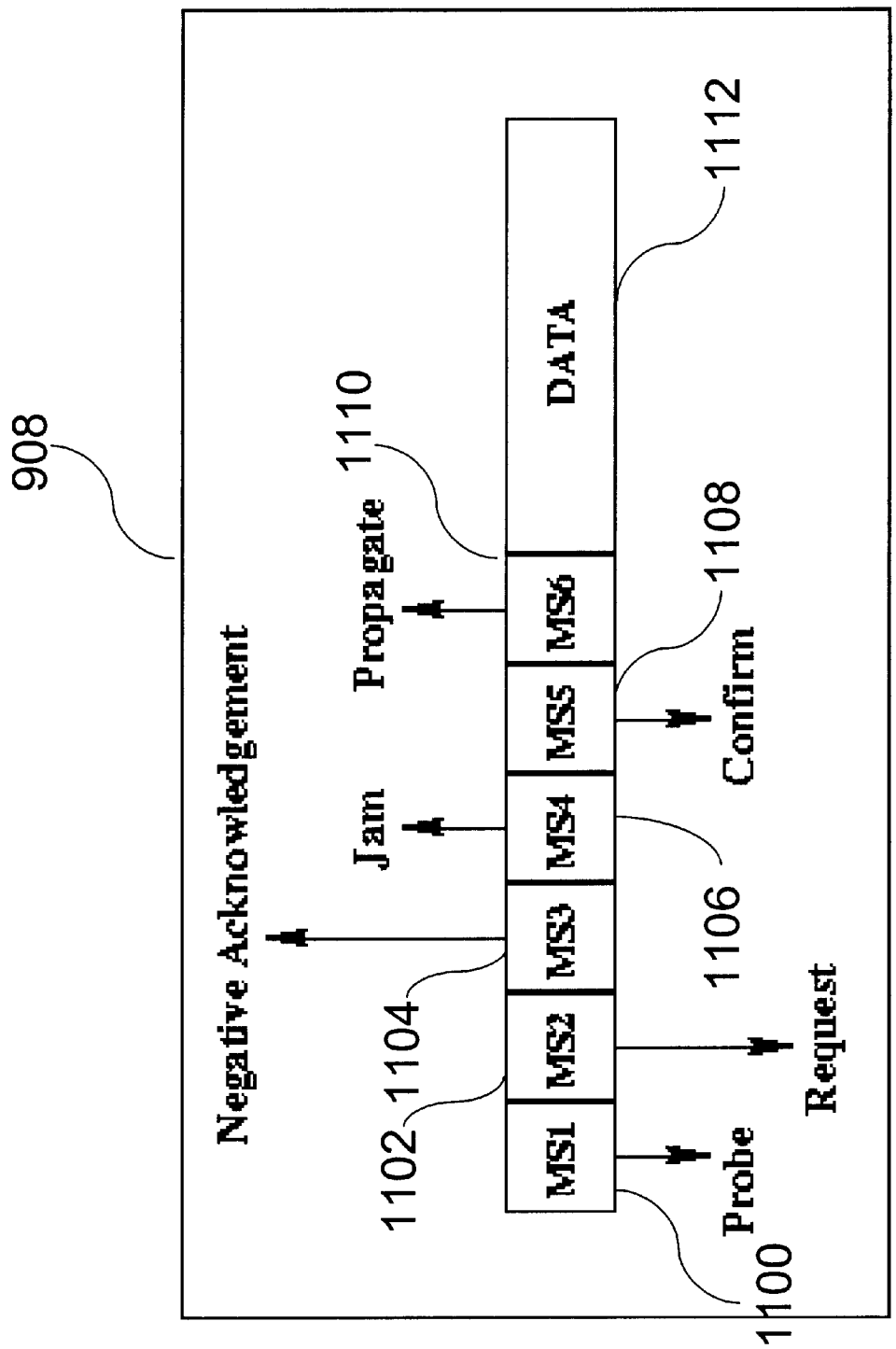
FIG. 11 is a frame diagram depicting, in detail, the structure of each data slot shown in FIG. 9.

The data slot structure is as shown in FIG. 11. At the start of every data slot, there are six minislots (depicted as MS1 to MS6 in the figure). These minislots are reserved for special signaling. For purposes of discussion, the set of nodes with a reservation for the data slot i is denoted by RN(i). Every node in RN(i) confirms its reservation before actually transmitting data. Note that in the case of a static network (with no deadlocks), RN(i) is either singleton or empty so that at most one node has exclusive reservation for the data slot i.

Signaling within a data slot 908 can be divided into six phases corresponding to each of the minislots: probe 1100, request 1102, negative acknowledgement 1104, jam 1106, confirm 1108 and propagate 1110. The data 1112 is transmitted after the reservation has been confirmed through use of the series of minislots. Consider a data slot i 908. In the probe phase, every node in RN(i) transmits a request to broadcast in the probe minislot (MS1) 1100 with probability p. A node in RN(i) transmits a request to broadcast in the request minislot (MS2) 1102 during the request phase if it previously did not transmit a request to broadcast in MS1. A neighbor of a node in RN(i) notices a reservation conflict if it receives two different requests to broadcast in the probe minislot (MS1) 1100 and the request minislot (MS2) 1102, or if a collision occurs in the probe minislot (MS1) 1100 or the request minislot (MS2) 1102. A node in RN(i) also sees a reservation conflict if it receives a request to broadcast other than its own or if a collision occurs in the probe minislot (MS1) 1100 or the request minislot (MS2) 1102. In the negative acknowledgement 1104 minislot (MS3), every node (including those in RN(i)) that experiences a reservation conflict transmits a negative acknowledgement packet (signal). A node in RN(i) cancels its reservation if it receives a negative acknowledgement packet or collision in the negative acknowledgement 1104 minislot (MS3), or if it already noticed a reservation conflict. A node not in RN(i) transmits a jamming signal in the jam minislot 1106 (MS4) if and only if it received exactly one request to broadcast (in the probe minislot (MS1) 1100 or the request minislot (MS2) 1102) and there was no reservation conflict. In the confirm minislot 1108, nodes in RN(i) that do not perceive a reservation conflict transmit a confirmation packet in the confirm minislot 1108 (MS5). This is done to confirm their reservation to their one-hop neighbors. In the propagate minislot 1110 (MS6), a neighbor of a node in RN(i) upon receiving a clear confirmation packet, transmits a propagate packet. Finally, a node in RN(i) cancels its reservation if it neither receives a propagate packet nor experiences a collision in the propagate minislot 1110 (MS6).

The combination of probe and request phases try to break deadlocks that are undetected during reservation signaling, or that occur dynamically. The actions taken in the negative acknowledgement 1104 minislot (MS3) and the confirm minislot 1108 (MS5) are identical to the negative acknowledgement and reservation confirmation phases in the broadcast reservation signaling discussed above. Note that for a data slot i if RN(i) is not singleton, then every node in RN(i) realizes a conflict after the minislot negative acknowledgement 1104 minislot (MS3) unless a deadlock goes undetected. On recognizing a conflict, nodes in RN(i) cancel their reservation for slot i. In the absence of any conflict, the one-hop and two-hop neighbors of a broadcast sender (a node in RN(i)) are informed about the reservation using the confirm minislot 1108 (MS5) and the propagate minislot 1110 (MS6) respectively. It is also noteworthy that, failure to receive a propagate packet in the propagate minislot 1110 (MS6) in response to a confirmation packet in the confirm minislot 1108 (MS5) notifies the broadcast sender of its isolation. The jamming packet (signal), which may be transmitted in the in the jam minislot 1106 (MS4) is used by all the potential receivers. It is quite useful in improving the spatial reuse in a case where the broadcast technique is used and the majority of the traffic is unicast, as will be discussed further herein.

Total signaling overhead used in the broadcast technique of the present invention is (m+2)S+6D minislots. Here S and D refer to the number of reservation and data slots in a frame respectively. The parameter m is the number of minislots used in the request phase during the reservation signaling. Note that the signaling uses minislots which are very short compared to the data slots, so their contribution to the overall overhead is not great, considering the robustness they facilitate. Next, a discussion regarding various optimizations to the broadcast technique of the present invention is provided.

With the broadcast technique of the present invention, unicast transmissions are possible as a special case of broadcast transmissions. However, this generally results in less-than-optimal channel utilization when majority of the transmissions are unicast because a slot reserved for broadcast packets can only be utilized by one node in a two-hop neighborhood. On the other hand, as mentioned previously, multiple unicast transmissions are possible within a two-hop neighborhood. Two possible approaches can be used for improving the channel utilization when the majority of the transmissions are unicast—(i) the unicast techniques of the present invention may be used in conjunction with the broadcast reservation technique discussed here; and (ii) the broadcast reservation technique itself may be modified to more efficiently support unicast transmissions within its framework through modified signaling. The latter approach is reviewed here.

An optimization is now introduced to improve the capability of the broadcast reservation technique for use with unicast traffic. The explanation here discusses the adaptation of the broadcast technique to operate in a manner similar to that of the unicast technique discussed above. The objective is to enable multiple unicast transmissions when a reserved slot is not used for broadcast transmissions. To further explain, consider a node x with a reservation for a slot i and further assume that x has only unicast data to transmit. Signaling at the beginning of data slot (in this case, slot i) is modified as follows. If x has unicast packet for some neighbor y, then x transmits a request to send signal, as discussed in the section on the unicast technique, to y in the probe minislot (MS1) 1100 or the request minislot (MS2) 1102 instead of a request to broadcast signal. Upon hearing a clear request to send signal from x, y replies back with a clear to send signal (clear-to-send) in the negative acknowledgement 1104 minislot (MS3) and also sends a jamming signal in the jam minislot 1106 (MS4). Any neighboring node z of x that receives the request to send in the request minislot (MS2) 1102 and is not jammed can potentially transmit a unicast packet to one of its neighbors other than x. Such nodes attempt a request to send/clear to send handshake in the confirm minislot 1108 (MS5) and the propagate minislot 1110 (MS6), respectively. The other actions taken during reservation are exactly as specified in the section about adaptation to mobility changes. Every pair of nodes with a successful request to send/clear to send handshake will take part in unicast transmissions. This optimization for unicast transmissions allows the broadcast transmission scheme to be utilized in a manner mirroring that of the unicast transmission scheme. It not only allows maximization of the spatial reuse of the channel but also preserves the existing reservations.

Figure 12:
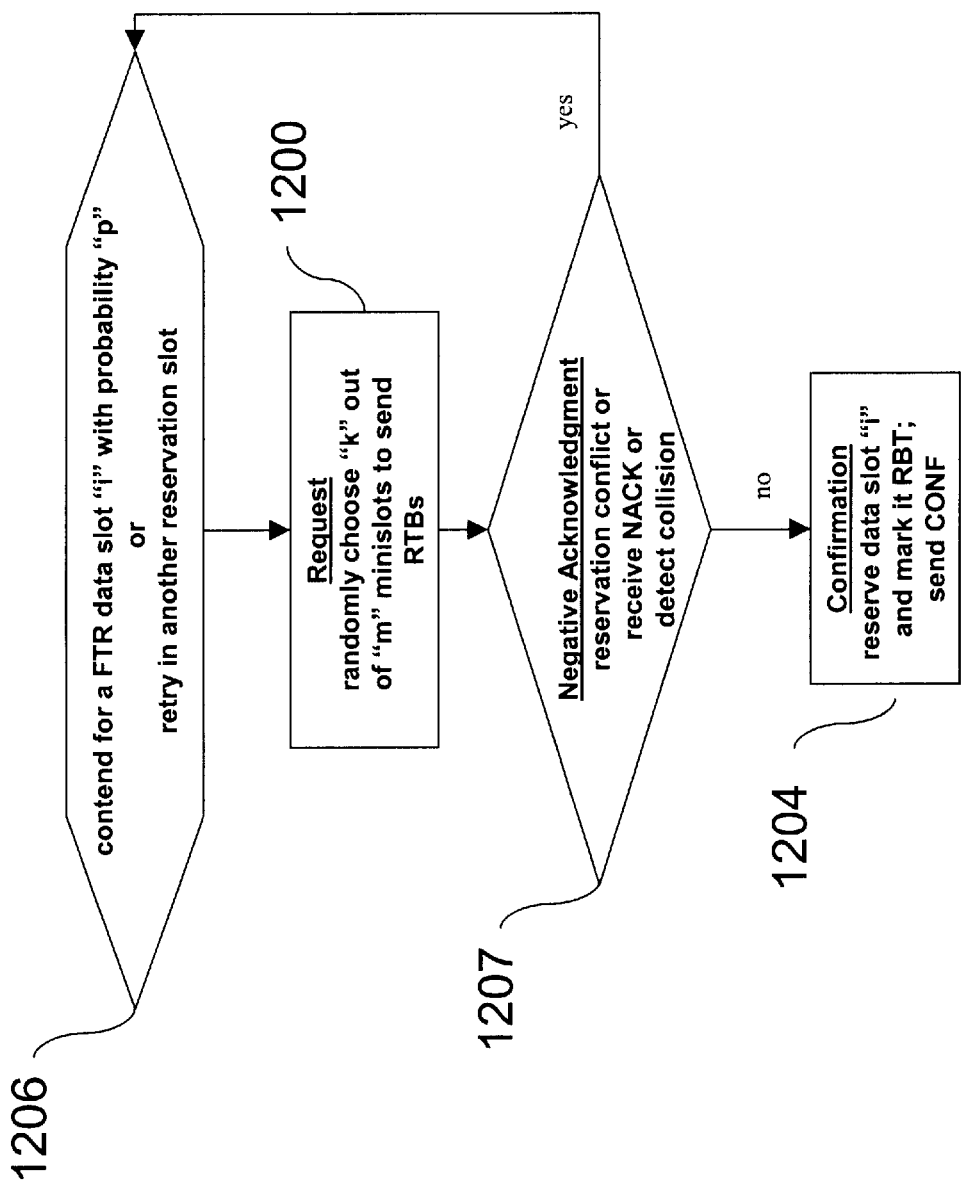
FIG. 12 is a flow diagram flow diagram depicting the actions occurring relative to a transmitter node for each reservation slot during broadcast communications with the present invention.
Figure 13:
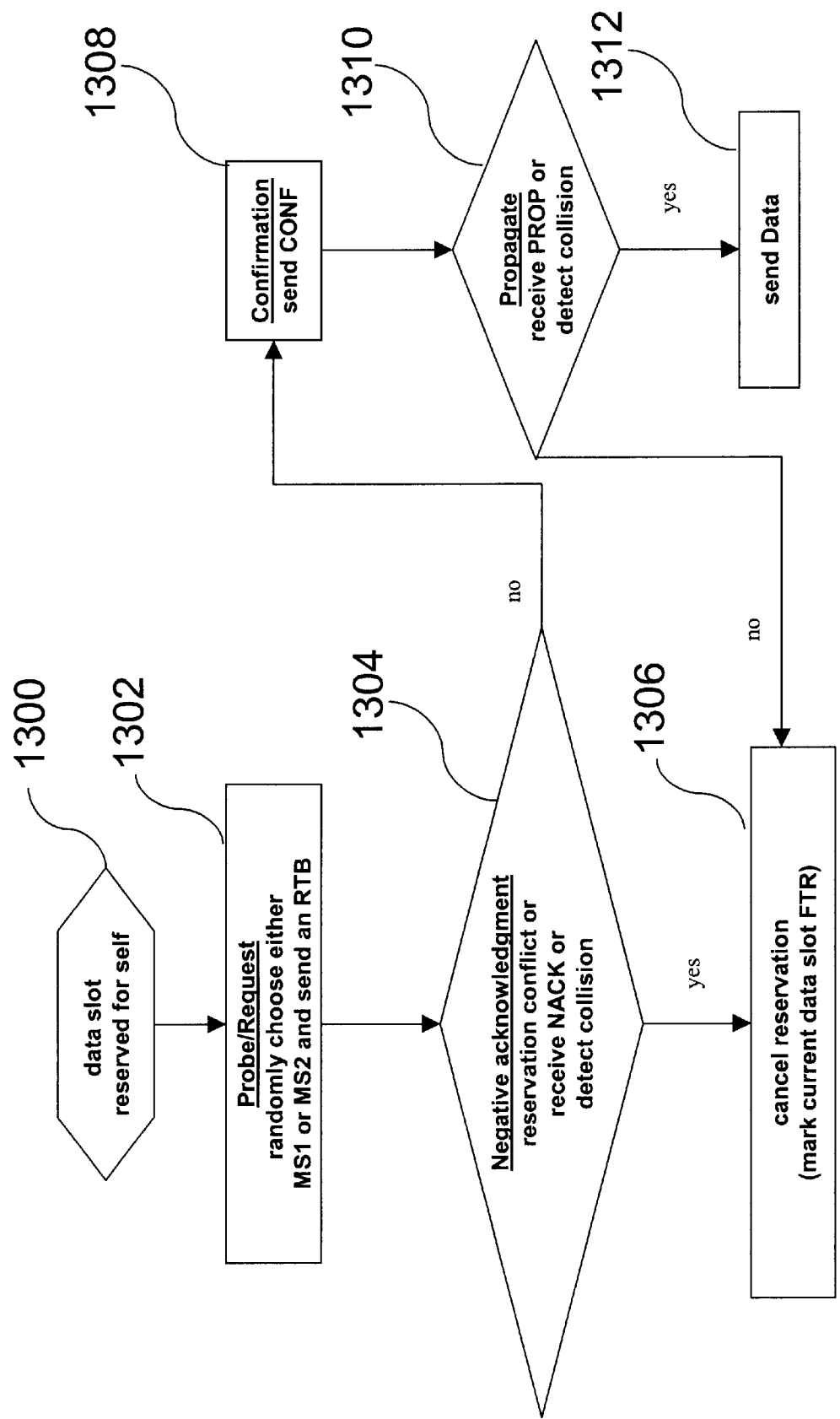
FIG. 13 is a flow diagram flow diagram depicting the actions occurring relative to a receiver node for each reservation slot during broadcast communications with the present invention.
Figure 14:
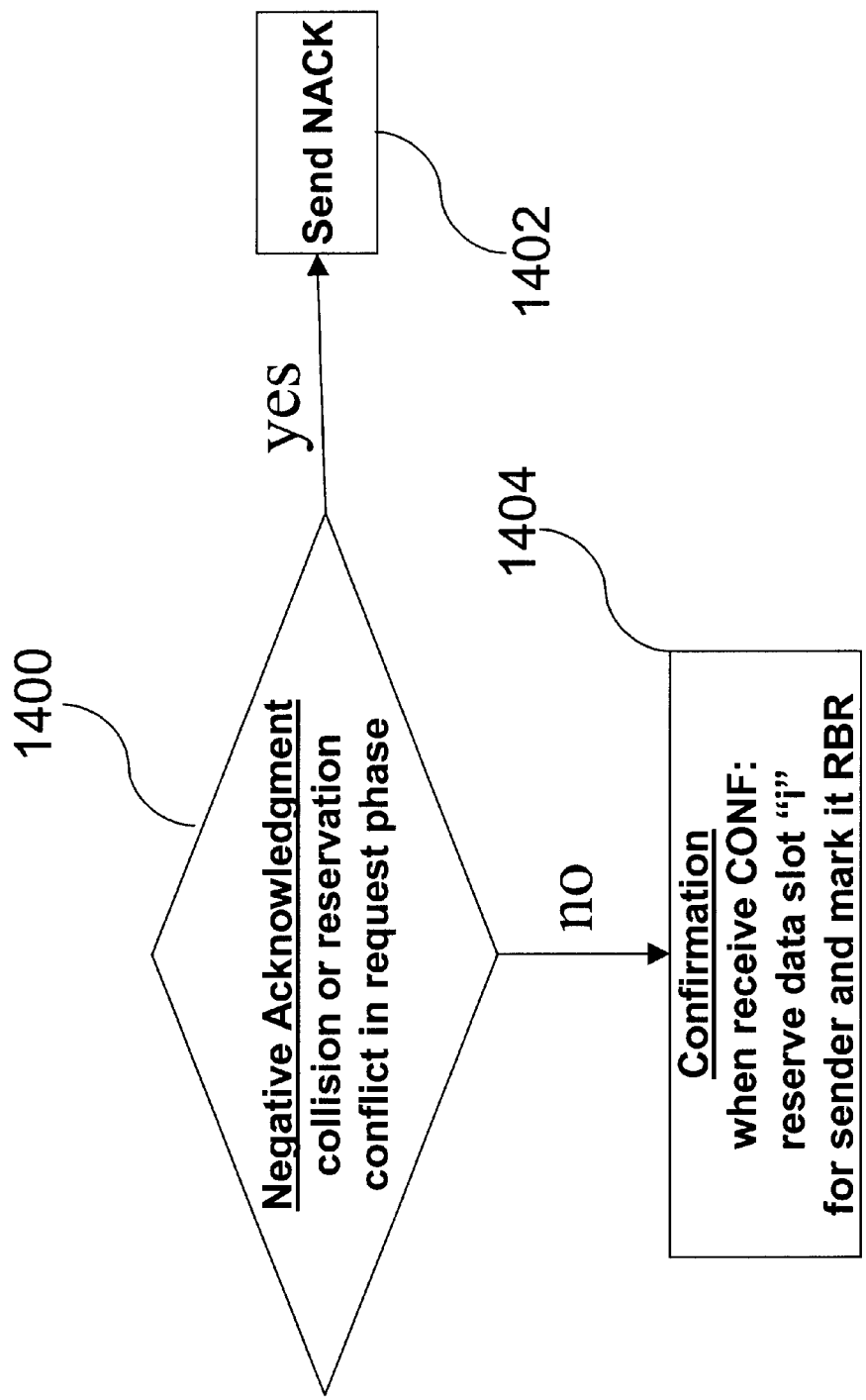
FIG. 14 is a flow diagram flow diagram depicting the actions occurring relative to a transmitter node for each data slot during broadcast communications with the present invention.

In order to more clearly describe the reservation process for the broadcast reservation technique of the present invention, flowcharts are provided in FIGS. 12 to 14. The flow charts are intended to graphically assist in providing a better understanding of the reservation process from the points of view of a transmitter and of a receiver, and in the signaling transmissions and in the data transmissions. As is the case for unicast reservations, the broadcast reservation scheme is broken into two sections, one comprising signaling in a plurality of reservation slots 906 in which the initial reservations take place, and one comprising signaling in a plurality of data slots 908 in which a follow-up check on the initial reservations takes place, so that reservations may be confirmed prior to the transmission of data. Also, as discussed relative to the unicast technique, in the context of the apparatus of the present invention, the steps in the transmission reservation technique are in the form of means, typically comprising a command sequence, operating within a data processing system 100.

The process undertaken by a transmitter during the reservation portion of the reservation technique is depicted in FIG. 12. In order perform the an initial reservation, the transmitting node sends a request to broadcast signals to neighboring nodes in k randomly selected request minislots selected from a total of m available request minislots 1000, where k is less than in 1200. The transmitting node then waits in the reservation portion for performing an original reservation by awaiting the receipt of a negative acknowledgement, a reservation conflict, or the detection of a collision in the negative acknowledgement minislot 1002 of the current reservation slot 906, depicted by block 1202. When a negative acknowledgement is received, the node awaits the reservation portion of the next frame in order to attempt a reservation again. If no negative acknowledgement is received, the transmitting node sends a reservation confirmation in the confirmation minislot 1204 and designates that the corresponding data slot 908 is reserved for broadcast transmission in its data slot classification table. If the node fails to reserve a data slot in the current reservation slot 906, it will again try to contend for a data slot 908 in another reservation slot 906, depicted by block 1206.

After successfully reserving a data slot 908 in the reservation portion of the technique, the node awaits (for that data slot) the data transmissions portion of the technique, in which, for each data slot reserved by the transmitting node, a reservation check is performed by the steps (means) depicted in FIG. 13. After a successful reservation 1300, the transmitting node randomly selects either the probe minislot 1100 or the request minislot 1102 and transmits a request to broadcast packet in the selected minislot 1302. The transmitting node then remains silent and awaits the receipt of a negative acknowledgement in the negative acknowledgement minislot 1304. The negative acknowledgement is sent from recipient nodes depending on whether there was a collision or a clear transmission in the probe minislot 1100 or the request minislot 1102. If a negative acknowledgement, a reservation conflict, or a collision is received, the node cancels its reservation and designates the current data slot in its data slot classification database as free for transmission or reception 1306. If no negative acknowledgement, reservation conflict, or collision is received in the negative acknowledgement minislot, a confirmation packet (signal) is transmitted by the transmitting node in the confirmation minislot 1308. After transmitting a confirmation packet, the node awaits the receipt of a propagate signal in the propagate minislot 1310. When a propagate signal or a collision is received in the propagate minislot, the transmitting node sends data in the data sub-portion of the data slot 1312. When a propagate signal or a collision is not received in the propagate minislot, the transmitting node marks the current data slot as free to transmit or receive in the current data slot and cancels its reservation 1306.

The process undertaken by a receiving node during the reservation portion of the broadcast reservation technique is depicted in FIG. 13. Similar to the discussion regarding the transmitting node during the broadcast reservation, the discussion regarding the receiving node will be broken into a discussion of the actions that occur during the signaling portion of the frame and the actions that occur during the data portion of the frame. In the signaling portion, in each of the m request minislots 1000, the receiving node first attempts to determine whether a collision or reservation conflict has occurred in the request minislot. Based on this determination, the receiving node determines whether to transmit a negative acknowledgement packet in the negative acknowledgement minislot 1400. The receiving node transmits a negative acknowledgement signal 1402 if a collision or reservation conflict occurs. This causes the transmitting node to attempt a reservation in another minislot. On the other hand, if no collision or reservation conflict occurs, the receiving node does not send a negative acknowledgement, and instead transmits a confirmation packet in the confirmation slot 1404. The receiving node reserves the data slot for the transmitting node and marks it as reserved for (broadcast) reception in its data slot reservation database. After a confirmation is made, the receiving node then awaits entry into the data portion of the frame for the appropriate data slot to take further action with regard to this reservation.

Figure 15:
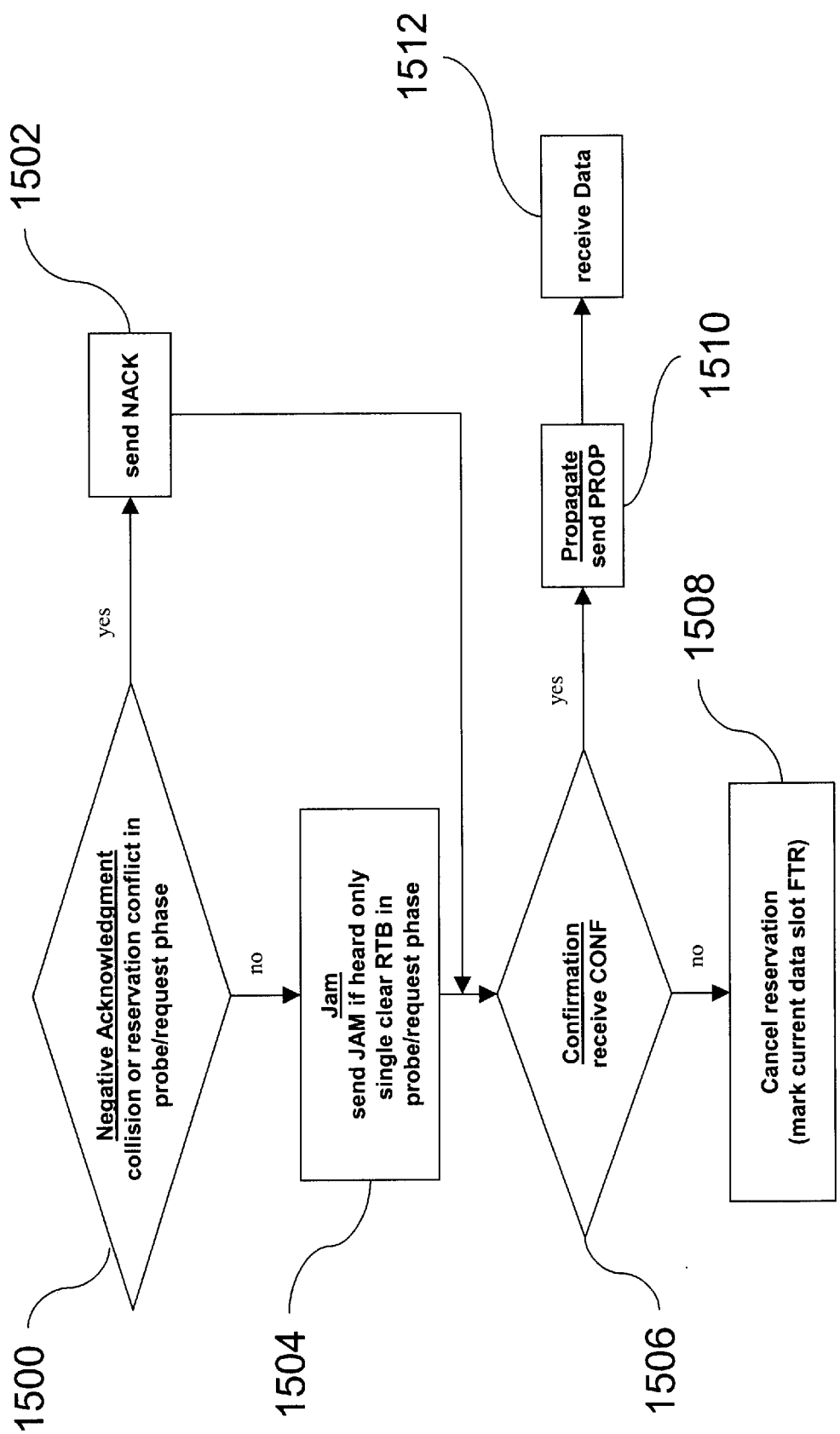
FIG. 15 is a flow diagram flow diagram depicting the actions occurring relative to a receiver node for each data slot during broadcast communications with the present invention.

The actions performed by the receiving node during the data portion of the frame with respect to each data slot reserved for broadcast transmissions is depicted in the flow chart of FIG. 15. In each data slot reserved, the receiving node performs a reservation check to ensure that the reservation is still successful. First, the node detects whether a collision or reservation conflict exists in either the probe minislot 1100 or the request minislot 1102 in order to determine whether to transmit a negative acknowledgement packet 1500. When either a collision or a reservation exists in the probe minislot 1100 or the request minislot 1102, transmitting a negative acknowledgement in the negative acknowledgement minislot 1502 and in the remaining silent in the jam minislot; and when no collision or reservation conflict exists in either the probe minislot or the request minislot, remaining silent in the negative acknowledgement minislot and transmitting a jam signal in the jam minislot 1504. Next, the receiving node awaits the reception of a confirmation signal in the confirmation slot 1506. If no confirmation signal is received in the confirmation minislot, the receiving node marks the current data slot as free to receive and remains silent in the propagate minislot 1508. The receiving node thus cancels the reservation and ignores data in the corresponding data slot of the data sub-portion. On the other hand, if a confirmation signal is received in the confirmation minislot, the receiving node transmits a propagation signal in the propagate minislot 1510 and receives data in the corresponding data slot in the data sub-portion of the frame from the transmitting apparatus 1512.

b. Correctness of the Techniques for Broadcast Transmission

Broadcast is successful if every neighboring node receives the broadcast successfully. The focus of the broadcast technique is to ensure successful broadcasts and at the same time maximize spatial reuse the slots to achieve higher utilization. In this section, the correctness of broadcast reservation signaling in the broadcast technique is proven in the absence of deadlocks. Recall that deadlocks are possible during the broadcast reservation because nodes cannot transmit and receive at the same time. Since the probability of deadlocks can be made negligible by the proper choice of the parameter m, the technique is very robust for most realistic scenarios.

Theorem

A contending node that successfully reserves a data slot is unique in its two-hop neighborhood, unless a deadlock occurs among the contending nodes during the reservation process.

Proof

This theorem is proven by considering the cases in which deadlocks cannot happen. Specifically, a deadlock cannot occur between a set of multiple neighboring contenders if: (i) at least a pair of contenders have a common receiving neighbor (i.e., non contending neighbor) and (ii) at least a pair of contenders do not transmit request to broadcast packets in identical set of minislots during the reservation request phase. Clearly, no deadlock is possible if there is only one contending node. In each of the above cases, it is proven that if a node is successful in reserving a slot, then it is unique in the two-hop neighborhood.

When two contending nodes have a common receiving neighbor, their request to broadcast packets collide at the neighbor which transmits a negative acknowledgement packet in the negative acknowledgement 1104 minislot (MS3). Since both the contenders receive the negative acknowledgement packet, none of them are successful in reserving the data slot.

Next, the second case is discussed. Note that deadlocks occur between a fully connected set of contending nodes. Thus, it is sufficient for a pair of nodes in that set to detect a potential deadlock and to report it to others through the transmission of a negative acknowledgement packet. If a pair of neighboring contenders exists that do not transmit request to broadcast packets in exactly the same minislots, then each member of the pair would hear the other node's request to broadcast packet in at least one of the minislots during the request phase. Both of them would transmit a negative acknowledgement packet to prevent the deadlock and thus, all the contenders would be unsuccessful in their attempt.

Therefore, the only case where a contending node could be successful in its reservation without deadlocks is when it is the sole contender in its two-hop neighborhood.

c. Further Discussion Regarding the Deadlock Probability

In this section, the bounds for the probability of deadlock are derived in terms of the parameters m, k, and the minimum and maximum degree of nodes in the network. A fully connected network of n nodes is considered because deadlocks occur only among a fully connected set of contending nodes. Recall that during the reservation request phase, each contending node has to randomly choose k (<m) minislots to transmit request to broadcast packets. A deadlock happens among a set of neighboring nodes if all of them choose exactly the same k minislots and no pair of nodes in that set has a common receiver. Note that in a fully connected network, a node's neighbors comprise of all nodes excluding itself. Thus, either all the nodes are deadlocked or none of them are.

The probability for all nodes to choose the same k out of m minislots, if choices are equally probable is:

$$P[deadlock] = \frac{C(m, k)}{C(m, k)^n} = \frac{1}{C(m, k)^{n-1}} \quad (1)$$

where C(m, k) denotes the combination of k given m elements. The above result indicates that (i) C(m, k) has to be maximized to reduce the probability of deadlock; and (ii) as n increases, the deadlock probability decreases. For a given value of m, C(m, k) is maximum if $$k = \left\lfloor \frac{m}{2} \right\rfloor.$$

Since C(m, k) increases much faster than m itself, small values of m are sufficient to obtain very low probability of deadlock. For different values of n and varying m, the deadlock probability is plotted in fig. FIG. 16(a). For example, if m=6, k=3 and n=2, then the probability of deadlock is in the order of $10^{-2}$. To achieve the same deadlock probability with a single minislot reservation request phase as is used in techniques other than the present invention, each of the contending nodes has to transmit a request to broadcast packet with probability $$p = 10^{-\frac{2}{n}}.$$

This clearly results in extremely poor utilization, and thus helps to explain the benefit of the approach of spanning the request phase across multiple minislots to break deadlocks without affecting the utilization. This observation is confirmed in FIG. 17(b), where deadlock probability is shown for different contention probabilities p and network sizes n.

d. Measurement-Based Reservation Adjustment

Note that this discussion mirrors that of the same topic in the discussion of the unicast technique. While the reservation scheme discussed to this point does not prohibit a node with an ongoing reserved connection from reserving additional timeslots for the current connection, it is not trivial "when" to trigger such an adjustment. This is because of the unpredictability of the traffic fluctuation. Therefore, it is necessary to be able to dynamically adjust the reservation level by continuously observing the traffic rate and the queue length associated with the traffic.

The technique is as follows:

1. Let R be the current reservation bandwidth (slots/frame);
2. Let $B_i$ denote the queue length at the end of i-th frame (slots);
3. If $B_i > a*R$ for some constant a (>=1), the node attempts to reserve additional $B_i - R$ slots during the signaling phase of (i+1)-th frame;
4. Let U denote the number of unused timeslots during a frame; and
5. If U is nonzero for N consecutive frames, the node releases the average number of unused slots per frame (during the last N frames) in the next frame.

The value used for the constant a depends on the delay requirement at this node. For example, if the delay and jitter requirements are stringent, a value close to 1 must be used.

The value used for N depends on the degree of traffic fluctuation. If the input traffic fluctuation is high, a larger value is desirable. Otherwise, a small value is desirable (e.g. 3).

What is claimed is:

1. A transmitting apparatus for adaptive bandwidth reservation in wireless ad-hoc networks, the apparatus comprising a data processing system including a wireless communication interface for transmitting and receiving wireless communication signals coupled with a processor and a memory coupled with the processor for storing data and programs, the data processing system further comprising:

a. means for generating data to transmit via a wireless channel in a TDMA frame, where the TDMA frame is divided into a signaling portion and a data portion, with the signaling portion comprising signaling slots, with each signaling slot comprising a minislot triplet including a request to send minislot, a (not) clear to send minislot, and a confirmation minislot, and with the data portion comprising data slots, with each data slot including a receive beacon portion, a data portion, and an acknowledgement portion; and b. means, operating in correspondence to each minislot triplet, for:
     (1) determining a data slot from a set of slots available for transmission in which a reservation is desired;
     (2) transmitting a request to send data in the request to send data slot, with the request to send corresponding to a data slot in which a reservation is desired;
     (3) receiving, as a result of transmitting the request to send data, a (not) clear to send signal indicating whether the data slot is available for sending data, and for determining whether the (not) clear to send signal indicates a clear to send status, a not clear to send status, or a collision;
     (4) means for operating the means for transmitting a request to send data again for the next minislot triplet when either a not clear to send status or a collision is received; and
     (5) means for indicating that the data slot is reserved for transmission when a clear to send signal is received and for sending a confirmation signal in the confirmation signal minislot and for transmitting data in the reserved data slot.

2. A transmitting apparatus for adaptive bandwidth reservation in wireless ad-hoc networks as set forth in claim 1, further comprising a database stored in the memory for indicating whether a data slot is reserved for transmission.

3. A transmitting apparatus for adaptive bandwidth reservation in wireless ad-hoc networks as set forth in claim 1, wherein the request to send data includes an identifier for an intended recipient apparatus and a transmission data length.

4. A transmitting apparatus for adaptive bandwidth reservation in wireless ad-hoc networks as set forth in claim 3, wherein the means for receiving a (not) clear to send signal is configured to receive a (not) clear to send signal including the identifier for an intended recipient apparatus as transmitted by the request to send, and the transmission data length available for the transmission.

5. A transmitting apparatus for adaptive bandwidth reservation in wireless ad-hoc networks as set forth in claim 4, further comprising means, operating in the data processing system in correspondence to each minislot triplet, for determining whether to transmit data based on a comparison between the transmission data length and the transmission data length available for the transmission.

6. A receiving apparatus for adaptive bandwidth reservation in wireless ad-hoc networks, the apparatus comprising a data processing system including a wireless communication interface for transmitting and receiving wireless communication signals coupled with a processor and a memory coupled with the processor for storing data and programs, the data processing system further comprising:

a. means for receiving data via a wireless channel in a TDMA frame, where the TDMA frame is divided into a signaling portion and a data portion, with the signaling portion comprising signaling slots, with each signaling slot comprising a minislot triplet including a request to send minislot, a (not) clear to send minislot, and a confirmation minislot, and with the data portion comprising data slots, with each data slot including a receive beacon portion, a data portion, and an acknowledgement portion;

b. means for receiving a request to send data in a data slot and determining whether the present apparatus is the intended receiver of the data, and whether the whether the data slot in which data is requested to be sent is a slot in which the present apparatus is free to receive and:
     (1) when the present apparatus is the intended receiver, and the data slot in which data is requested to be sent is a slot in which the present apparatus is free to receive and when the slot is one in which the apparatus is free to receive, issuing a clear to send signal in the (not) clear to send minislot and awaiting for receipt of a confirmation in the confirmation minislot; and
     (2) when the present apparatus is the intended receiver, and the data slot in which data is requested to be sent is a slot in which the present apparatus is free to receive and when the slot is not one in which the apparatus is free to receive, remaining silent in the (not) clear to send minislot;
     (3) when the present apparatus is not the intended receiver, checking whether the requesting slot is reserved for reception, and
        (i) when the slot is reserved for reception, issuing a not clear to send signal in the (not) clear to send slot; and
        (ii) when the slot is not reserved for reception, remaining silent in the (not) clear to send slot and awaiting receipt of a confirmation in the confirmation minislot, and marking the slot free for transmission; and c. means for inserting a not clear to send signal in the (not) clear to send slot when a collision is detected.

7. A receiving apparatus for adaptive bandwidth reservation in wireless ad-hoc networks as set forth in claim 6, further comprising a database stored in the memory for indicating whether a data slot is free for reception, reserved for reception, or free for transmission.

8. A receiving apparatus for adaptive bandwidth reservation in wireless ad-hoc networks as set forth in claim 6, wherein the means for receiving a request to send data is configured to receive requests to send data that include an identifier for an intended recipient apparatus and a transmission data length.

9. A receiving apparatus for adaptive bandwidth reservation in wireless ad-hoc networks as set forth in claim 8, wherein the means for receiving a (not) clear to send signal is configured to receive a (not) clear to send signal including the identifier for an intended recipient apparatus as transmitted by the request to send, and the transmission data length available for the transmission.

10. A transmitting and receiving apparatus for adaptive bandwidth reservation in wireless ad-hoc networks, the apparatus comprising a data processing system including a wireless communication interface for transmitting and receiving wireless communication signals coupled with a processor and a memory coupled with the processor for storing data and programs, the data processing system further comprising:
  a. means for generating data to transmit and receive via a wireless channel in a TDMA frame, where the TDMA frame is divided into a signaling portion and a data portion, with the signaling portion comprising signaling slots, with each signaling slot comprising a minislot triplet including a request to send minislot, a (not) clear to send minislot, and a confirmation minislot, and with the data portion comprising data slots, with each data slot including a receive beacon portion, a data portion, and an acknowledgement portion; and
  b. a transmitting portion comprising means, operating in correspondence to each minislot triplet, for:
    i. determining a data slot from a set of slots available for transmission in which a reservation is desired;
    ii. transmitting a request to send data in the request to send data slot, with the request to send corresponding to a data slot in which a reservation is desired;
    iii. receiving, as a result of transmitting the request to send data, a (not) clear to send signal indicating whether the data slot is available for sending data, and for determining whether the (not) clear to send signal indicates a clear to send status, a not clear to send status, or a collision;
    iv. means for operating the means for transmitting a request to send data again for the next minislot triplet when either a not clear to send status or a collision is received; and
    v. means for indicating that the data slot is reserved for transmission when a clear to send signal is received and for sending a confirmation signal in the confirmation signal minislot and for transmitting data in the reserved data slot; and
  c. a receiving portion comprising means for receiving a request to send data in a data slot and determining whether the present apparatus is the intended receiver of the data, and whether the whether the data slot in which data is requested to be sent is a slot in which the present apparatus is free to receive and:
    i. when the present apparatus is the intended receiver, and the data slot in which data is requested to be sent is a slot in which the present apparatus is free to receive and when the slot is one in which the apparatus is free to receive, issuing a clear to send signal in the (not) clear to send minislot and awaiting for receipt of a confirmation in the confirmation minislot; and
    ii. when the present apparatus is the intended receiver, and the data slot in which data is requested to be sent is a slot in which the present apparatus is free to receive and when the slot is not one in which the apparatus is free to receive, remaining silent in the (not) clear to send minislot;
    iii. when the present apparatus is not the intended receiver, checking whether the requesting slot is reserved for reception, and
      (1) when the slot is reserved for reception, issuing a not clear to send signal in the (not) clear to send slot; and
      (2) when the slot is not reserved for reception, remaining silent in the (not) clear to send slot and awaiting receipt of a confirmation in the confirmation minislot, and marking the slot free for transmission; and
      iv. means for inserting a not clear to send signal in the (not) clear to send slot when a collision is detected.

11. A transmitting and receiving apparatus for adaptive bandwidth reservation in wireless ad-hoc networks as set forth in claim 10, further comprising a database stored in the memory for indicating whether a data slot is reserved for transmission, free for reception, reserved for reception, or free for transmission.

12. A transmitting and receiving apparatus for adaptive bandwidth reservation in wireless ad-hoc networks as set forth in claim 10, wherein the request to send data includes an identifier for an intended recipient apparatus and a transmission data length wherein the means for receiving a request to send data is configured to receive requests to send data that include an identifier for an intended recipient apparatus and a transmission data length.

13. A transmitting and receiving apparatus for adaptive bandwidth reservation in wireless ad-hoc networks as set forth in claim 12, wherein the (not) clear to send signal includes the identifier for an intended recipient apparatus as transmitted by the request to send, and wherein the means for receiving a (not) clear to send signal is configured to receive a (not) clear to send signal including the identifier for an intended recipient apparatus as transmitted by the request to send, and the transmission data length available for the transmission.

14. A transmitting and receiving apparatus for adaptive bandwidth reservation in wireless ad-hoc networks as set forth in claim 13, further comprising means, operating in the data processing system in correspondence to each minislot triplet, for determining whether to transmit data based on a comparison between the transmission data length and the transmission data length available for the transmission.

15. A transmitting apparatus for adaptive bandwidth reservation in wireless ad-hoc networks, the apparatus comprising a data processing system including a wireless communication interface for transmitting and receiving wireless communication signals coupled with a processor and a memory coupled with the processor for storing data and programs, the data processing system further comprising means for generating data to transmit via a wireless channel in a TDMA frame, where the TDMA frame is divided into a signaling portion and a data portion, with the signaling portion comprising a plurality of m request minislots, a negative acknowledgement minislot, and a confirmation minislot, and with the comprising data slots, each data slot including a probe minislot, a request minislot, a negative acknowledgement minislot, a jam minislot, a confirm minislot, a propagate minislot, and a data sub-portion; and means, operating in correspondence with each frame:
  i. in the reservation portion for performing an original reservation by:
    (A) sending requests to broadcast signals to neighboring apparatus, in k randomly selected request minislots of the m request minislots, where k<m;
    (B) receiving negative acknowledgements, and when a negative acknowledgement is received, awaiting the reservation portion of the next frame to attempt reservation again; and
    (C) sending a reservation confirmation when no negative acknowledgement is received and indicating that the slot is reserved for broadcast transmission in the slot table; and when the slot is reserved for broadcast transmission,
  ii. in the data portion, in each data slot reserved by the apparatus for broadcast transmission, for performing a reservation check by:

(A) randomly selecting either the probe minislot or the request minislot and transmitting a request to broadcast in the selected minislot;
(B) detecting whether a request to broadcast from another apparatus exists in either the probe minislot or the request minislot or whether there is a collision in the probe minislot or the request minislot, and:
  a. when there is a request to broadcast from another apparatus exists in either the probe minislot or the request minislot or when there is a collision in the probe minislot or the request minislot, transmitting a negative acknowledgement in the negative acknowledgement minislot and marking the current data slot as free to receive;
  b. when there is no request to broadcast from another apparatus exists in either the probe minislot or the request minislot or when there is a collision in the probe minislot or the request minislot, transmitting a confirmation in the confirmation minislot and awaiting a propagate signal in the propagate minislot, and:
    i. when a propagate signal or a collision is received in the propagate minislot, sending data in the data sub-portion of the data slot; and
    ii. when a propagate signal or a collision is not received in the propagate minislot, marking the current data slot as free to receive.

16. A receiving apparatus for adaptive bandwidth reservation in wireless ad-hoc networks, the apparatus comprising a data processing system including a wireless communication interface for transmitting and receiving wireless communication signals coupled with a processor and a memory coupled with the processor for storing data and programs, the data processing system further comprising means for generating data to transmit via a wireless channel in a TDMA frame, where the TDMA frame is divided into a signaling portion and a data portion, with the signaling portion comprising a plurality of m request minislots, a negative acknowledgement minislot, and a confirmation minislot, and with the comprising data slots, each data slot including a probe minislot, a request minislot, a negative acknowledgement minislot, a jam minislot, a confirm minislot, a propagate minislot, and a data sub-portion; and means, operating in correspondence with each frame:
  i. in the signaling portion, in each of the m request minislots, for detecting a collision or reservation conflict in the request minislot, and:
    (A) when a collision or reservation conflict is detected, transmitting a negative acknowledgement in the negative acknowledgement minislot and remaining silent in the confirmation minislot; and
    (B) when no collision or reservation conflict is detected, marking the slot as reserved for broadcast reception and remaining silent in the negative acknowledgement and confirmation minislots; and
  ii. in the data portion, in each data slot, for performing a reservation check by:
    (A) detecting whether a collision or reservation conflict exists in either the probe minislot or the request minislot, and:
      a. if a collision or reservation conflict exists in either the probe minislot or the request minislot, transmitting a negative acknowledgement in the negative acknowledgement minislot and remaining silent in the jam minislot;
      b. if no collision or reservation conflict exists in either the probe minislot or the request minislot, remaining silent in the negative acknowledgement minislot and transmitting a jam signal in the jam minislot; and
    (B) awaiting the reception of a confirmation signal in the confirmation slot, and:
      a. if no confirmation signal is received in the confirmation minislot, marking the current data slot as free to receive and remaining silent in the propagate minislot and ignoring data in the data sub-portion; and
      b. if a confirmation signal is received in the confirmation minislot, transmitting a propagation signal in the propagate minislot and receiving data in the data sub-portion from the transmitting apparatus.

* * * * *